(12) United States Patent
Narayanaswamy Chandrasekaran et al.

(10) Patent No.: US 10,643,102 B2
(45) Date of Patent: May 5, 2020

(54) INCIDENT PREDICTION AND PREVENTION

(71) Applicant: ACCENTURE GLOBAL SOLUTIONS LIMITED, Dublin (IE)

(72) Inventors: Shrikanth Narayanaswamy Chandrasekaran, Bangalore (IN); Venkatesh Subramanian, Bangalore (IN); Anutosh Maitra, Bangalore (IN); Anurag Dwarakanath, Bangalore (IN); Pradeepkumar Duraisamy, Bangalore (IN); Aditya Bhola, Jabalpur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 243 days.

(21) Appl. No.: 15/698,277

(22) Filed: Sep. 7, 2017

(65) Prior Publication Data

US 2019/0034760 A1    Jan. 31, 2019

(30) Foreign Application Priority Data

Jul. 27, 2017 (IN) .............................. 201711026702

(51) Int. Cl.
  *G06F 11/00* (2006.01)
  *G06K 9/62* (2006.01)
  (Continued)

(52) U.S. Cl.
  CPC .......... *G06K 9/6223* (2013.01); *G06F 11/008* (2013.01); *G06F 11/0709* (2013.01); *G06F 11/3072* (2013.01); *H04L 41/5074* (2013.01)

(58) Field of Classification Search
  CPC .. G06K 9/6223; G06K 9/6217; G06K 9/6218; G06K 9/6219; G06K 9/622; G06K 9/6221; G06K 9/6222; G06K 9/6224; G06K 9/6226; G06F 11/008; G06F 11/0709; G06F 11/0751; G06F 11/0766; G06F 11/0769; G06F 11/0772; G06F 11/0775;
  (Continued)

(56) References Cited

U.S. PATENT DOCUMENTS 7,484,132 B2 * 1/2009 Garbow ................ G06F 11/008
                                                                714/26
10,291,493 B1 * 5/2019 Rustad .................... H04L 43/04
(Continued)

*Primary Examiner* — Anthony J Amoroso
(74) *Attorney, Agent, or Firm* — Mannava & Kang, P.C.

(57) ABSTRACT

In some examples, incident prediction and prevention may include ascertaining a plurality of past incidents, clustering the plurality of past incidents to generate a plurality of incidents clusters, and identifying, for each past incident of the plurality of past incidents that is in a respective incidents cluster of the plurality of incidents clusters, a time of occurrence. Incident prediction and prevention may include ascertaining a new incident, assigning the new incident to an incidents cluster of the plurality of incidents clusters, and determining, for the assigned incidents cluster, at least one further predicted incident associated with at least one further corresponding incidents cluster. Further, incident prediction and prevention may include determining a resolution to the at least one further predicted incident, and preventing occurrence of the at least one further predicted incident by executing the determined resolution to the at least one further predicted incident.

20 Claims, 21 Drawing Sheets

(51) Int. Cl.
*H04L 12/24* (2006.01)
*G06F 11/07* (2006.01)
*G06F 11/30* (2006.01)

(58) Field of Classification Search
CPC ............ G06F 11/0778; G06F 11/0781; G06F 11/0784; G06F 11/0787; G06F 11/079; G06F 11/0793; G06F 11/3065; G06F 11/3072; H04L 41/5074; H04L 41/06; H04L 41/0604; H04L 41/0609; H04L 41/0613; H04L 41/0618; H04L 41/0622; H04L 41/0627; H04L 41/0631; H04L 41/14; H04L 41/142; H04L 41/147; H04L 41/16; H04L 43/08; H04L 43/0817; H04L 43/0823; H04L 1/00
See application file for complete search history.

(56) References Cited

U.S. PATENT DOCUMENTS

| | | | |
|---|---|---|---|
| 2015/0178637 A1* | 6/2015 | Bogojeska | G06N 5/04 706/12 |
| 2015/0317197 A1* | 11/2015 | Blair | G06N 7/005 714/47.3 |
| 2018/0032971 A1* | 2/2018 | Karuppasamy | G06Q 10/20 |

* cited by examiner

I = Incident: A human reported text document at a particular date time.
Ipast= Set of past Incidents = { I1, I2, I3,......In }
Inew= A New Incident
cluster_label= class of incident
cluster_score= relevancy score for all the incidents in that cluster
C = A cluster represents a set of incidents with a score and a label = { [I1,I2.. In], cluster_score, cluster_label}

Cpast= Clusters of past incidents = {C1, C2, C3, .....Cn};
C(past+new)= Clusters of past incidents with a new incident = { C1, C2, C3, .....Cn }
Cnew= Subset of C(past+new) that contains only clusters which has Inew= { C1, C2, C3, .....Cn }.
Cright= A cluster in Cnew that has the maximum cluster_score= Max { ClusterScore[ Cnew] }
Cnext= A cluster that is connected by Cnew's thickest edge = Cright's[Max(outgoingEdge)]'s.cluster Pc = Predicted class of Incidents = The cluster_label for Cluster Cnext= Cnext.cluster_label
Et (Pc ) = Estimated occurrence of Pc
= {Summation Of[Mod(Time difference between succeeding incidents between Cright& Cnext)] }.Size Of [ Thickest Outgoing edge between ( Cright☐Cnext) ]

Fig. 15

```
/**
 * @param incidents
 * @return predictionModel
 */
public IncidentsCluster[] buildPredictionModel(Incident[] incidents) {
    IncidentsCluster[] predictionModel= cluster(incidents);
    for (IncidentsCluster sourceCluster: predictionModel) {
        for (Incident sourceIncident: sourceCluster.getIncidents()) {
            Incident nextIncident= getNextIncidentByTime(sourceIncident);
            IncidentsCluster[] incidentClusters= getClustersFor(nextIncident);
            for (IncidentsCluster targetCluster: incidentClusters) {
                if (sourceCluster.isEdgeExist(targetCluster)) {
                    sourceCluster.getEdge(targetCluster).incrementEdgeThickness();
                } else {
                    sourceCluster.createEdgeWith(targetCluster);
                }}}}
    return predictionModel;
}
```

Fig. 16

```
/**
 * @param pastIncidents
 * @param newIncident
 * @return
 */
public IncidentClass queryPredictionModel(Incident[] pastIncidents, Incident newIncident) {
    Incident[] allIncidents= new Incident[pastIncidents.length+ 1];
    IncidentsCluster[] predictionModel= buildPredictionModel(allIncidents);
    IncidentsCluster newIncidentsCluster= null;
    for (IncidentsCluster currentCluster: predictionModel) {
        if (currentCluster.contains(newIncident)) {
            if (newIncidentsCluster== null) {
                newIncidentsCluster= currentCluster;
            } else {
```

Fig. 17

```
if (currentCluster.getScore() > newIncidentsCluster.getScore()) {
  newIncidentsCluster= currentCluster;
} }}
Edge thickestEdge= null;
for (Edge edge: newIncidentsCluster.getOutgoingEdges()) {
  if (thickestEdge== null) {
    thickestEdge= edge;
  } else {
    if (edge.getThickness() > thickestEdge.getThickness()) {
      thickestEdge= edge;
    }
  }
}
return thickestEdge.getTargetCluster().getIncidentClass();
}
```

Fig. 18

INCIDENT PREDICTION AND PREVENTION

PRIORITY

The present application claims priority under 35 U.S.C. 119(a)-(d) to Indian patent application number 201711026702, having a filing date of Jul. 27, 2017, the disclosure of which is hereby incorporated by reference in its entirety.

BACKGROUND

In environments, such as enterprise environments, a variety of incidents may occur with respect to operation of an application, a device, a process, etc. Once an incident occurs, the incident may be reported to support personnel. The occurrence of the incident may lead to subsequent incidents if the incident is not mitigated in time. The support personnel may generate an incident ticket. The incident ticket may be classified according to priority (e.g., low, medium, high, etc.). The support personnel may resolve the incident, or, if needed, escalate the incident ticket to higher level support personnel. Once the incident is resolved, the incident ticket may be closed.

BRIEF DESCRIPTION OF DRAWINGS

Features of the present disclosure are illustrated by way of example and not limited in the following figure(s), in which like numerals indicate like elements, in which:

FIG. 15 illustrates determination of predicted class of incidents and estimated time of occurrence to illustrate operation of the incident prediction and prevention apparatus of FIG. 1 in accordance with an example of the present disclosure;

FIGS. 16-18 illustrate pseudocode to illustrate operation of the incident prediction and prevention apparatus of FIG. 1 in accordance with an example of the present disclosure;

DETAILED DESCRIPTION

Figure 1:
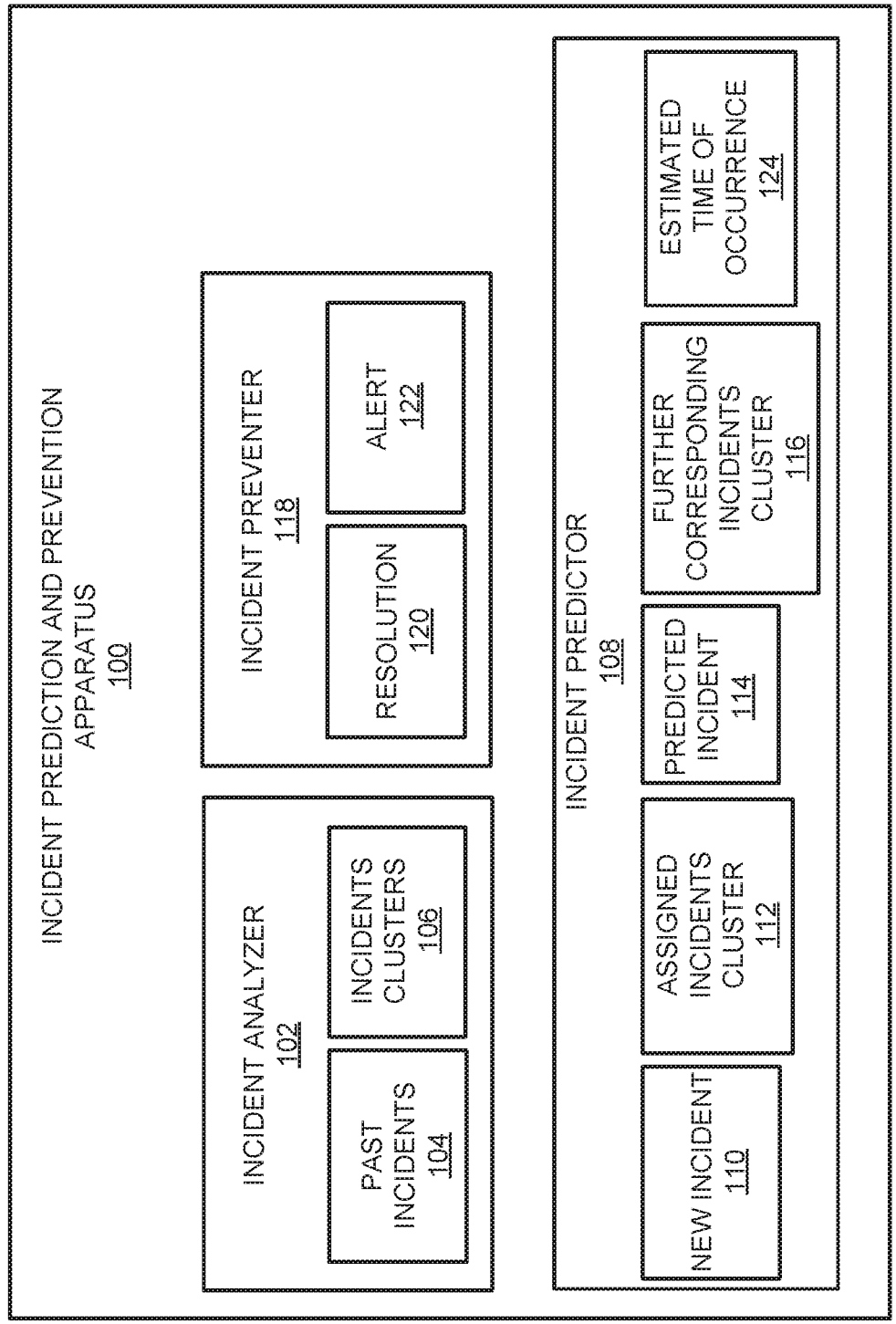
FIG. 1 illustrates a layout of an incident prediction and prevention apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Incident prediction and prevention apparatuses, methods for incident prediction and prevention, and non-transitory computer readable media having stored thereon machine readable instructions to provide incident prediction and prevention are disclosed herein. The apparatuses, methods, and non-transitory computer readable media disclosed herein provide for incident prediction and prevention by ascertaining a plurality (i.e., greater than one) of past incidents. For example, the past incidents may pertain to any type of incident such as a credit card swipe error, a password entry error, etc. The plurality of past incidents may be clustered to generate a plurality of incidents clusters. Each incidents cluster may pertain to a type of incident. For example, the incidents clusters may include incidents related to credit card swipe errors, password entry errors, etc. For each past incident of the plurality of past incidents that is in a respective incidents cluster of the plurality of incidents clusters, a time of occurrence may be identified. As disclosed herein, a prediction model may be generated based on the incidents clusters.

Once the prediction model is generated, a new incident may be ascertained and assigned to an incidents cluster of the plurality of incidents clusters. With respect to the assigned incidents cluster, at least one further predicted incident associated with at least one further corresponding incidents cluster may be determined. The at least one further predicted incident may represent an incident that is predicted to occur based on the occurrence of the new incident. With respect to the at least one further predicted incident, a resolution may be determined to prevent occurrence of the at least one further predicted incident. For example, the resolution may include executing a specified procedure to prevent occurrence of the at least one further predicted incident. Further, the resolution may be executed to prevent occurrence of the at least one further predicted incident. Alternatively or additionally, an alert may be generated to support personnel, and/or a display of predicted incidents, their proposed resolutions, and an estimated time of occurrence of the predicted incidents may be generated.

The apparatuses, methods, and non-transitory computer readable media disclosed herein thus provide for identification of potential problems that may occur in the future, for example, in application maintenance and support environments. Thus, if an alert is generated to support personnel, the support personnel may be made aware of an incident's likely occurrence prior to occurrence of the incident. The support personnel may proactively prepare for occurrence of the predicted incident, and take necessary actions prior to occurrence of the predicted incident.

With respect to incident prediction and prevention, support personnel may encounter a variety of technical challenges. For example, support personnel may attempt to analyze disparate heterogeneous voluminous machine logs to detect an incident such as a simple failure. With the extent of such heterogeneous voluminous machine logs that may include an extended amount of data that is to be analyzed, it is technically challenging to analyze such data to determine whether the data represents the occurrence of an incident. It is also technically challenging to analyze such data to determine whether a future incident may occur as a result of occurrence of the incident. Yet further, it is also technically challenging to analyze such data to determine when a future incident may occur as a result of occurrence of the incident. Moreover, with respect to human reported incidents, such incidents when reported in natural language unlike machine generated incidents are not fixed and/or structured statements. Hence, clustering (categorizing) incidents reported by humans in natural language is technically challenging, and requires subject matter expertise.

In order to address at least the aforementioned technical challenges, the apparatuses, methods, and non-transitory computer readable media disclosed herein implement unsupervised machine learning to build the prediction model. The prediction model may be based on incident class co-occurrence. The prediction model may be generated using the data of past incidents. When a new incident occurs, the new incident may be analyzed with respect to the prediction model. A next incident that is likely to occur may be determined based on the analysis of the new incident with respect to the prediction model. The next incident may be designated as a predicted incident. Further, an estimated time of occurrence of the predicted incident may be determined to prevent occurrence of the predicted incident.

The apparatuses, methods, and non-transitory computer readable media disclosed herein may also address technical challenges with respect to proactive incident management (as opposed to reactive incident management). For example, assuming that a system component is malfunctioning due to an incorrect password entry by a particular client of a set of clients, in such a case, the password entry may be corrected. However, if the malfunction occurs due to an application error with respect to the system component, the application error may result in further related errors with respect to the system. In the latter case, a chain of further incidents may occur with respect to the application error. This chain of further incidents may be predicted by the apparatuses, methods, and non-transitory computer readable media disclosed herein.

The apparatuses, methods, and non-transitory computer readable media disclosed herein may be applied to a variety of environments, such as enterprise environments. For example, the apparatuses, methods, and non-transitory computer readable media disclosed herein may be applied with respect to technical issues, customer related issues, etc., and generally, any issue that may be captured as an incident.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example incident prediction and prevention apparatus (hereinafter also referred to as "apparatus 100").

Referring to FIG. 1, the apparatus 100 may include an incident analyzer 102 that is executed by at least one hardware processor (e.g., the hardware processor 1902 of FIG. 19, and/or the hardware processor 2104 of FIG. 21) to ascertain a plurality of past incidents 104. The incident analyzer 102 may cluster the plurality of past incidents 104 to generate a plurality of incidents clusters 106. In this regard, the past incidents 104 (as well as new incidents as disclosed herein), may belong to more than one cluster. For example, an incident "debit card swipe failed issue" may belong to two incidents clusters 106 (e.g., an incidents cluster including 'debit card' type of incidents, and another incidents cluster including 'swipe failed' type of incidents).

The incident analyzer 102 may further identify, for each past incident of the plurality of past incidents 104 that is in a respective incidents cluster of the plurality of incidents clusters 106, a time of occurrence.

Figure 4:
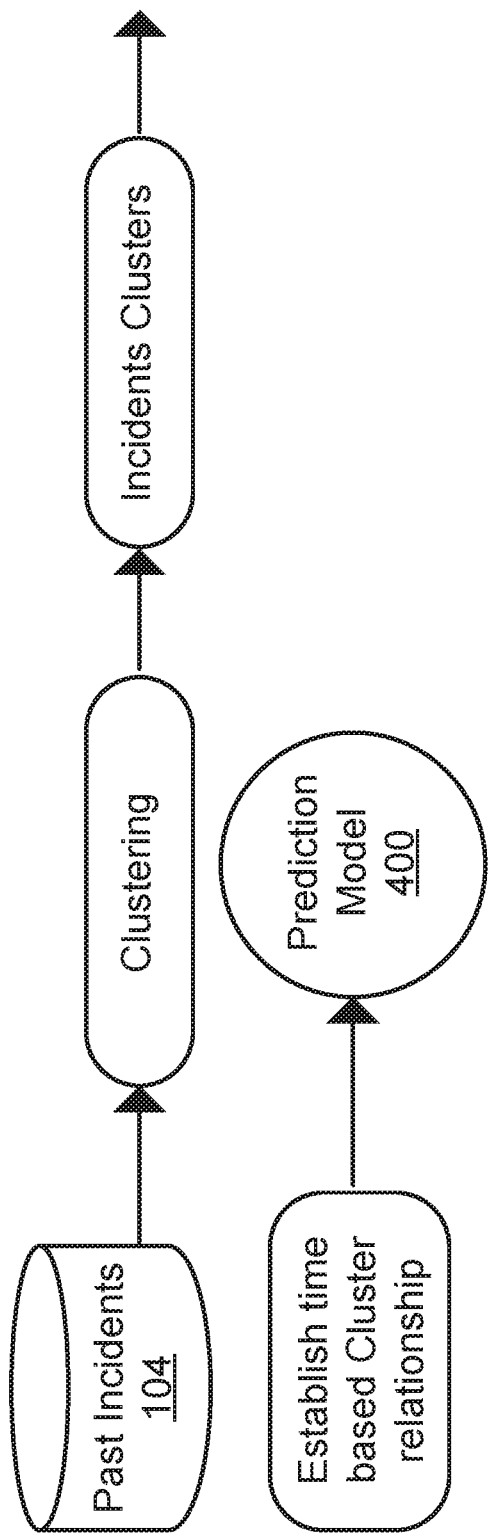
FIG. 4 illustrates an incident predictor of the incident prediction and prevention apparatus of FIG. 1 in accordance with an example of the present disclosure.
Figure 5:
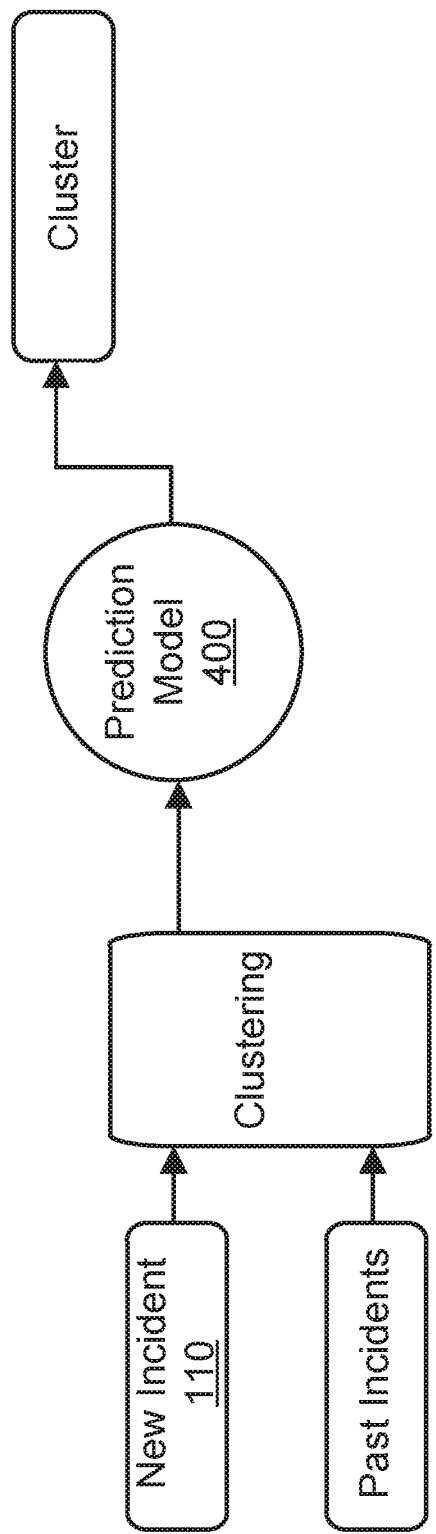
FIG. 5 illustrates further details of the incident predictor of the incident prediction and prevention apparatus of FIG. 1 in accordance with an example of the present disclosure.

Further, as disclosed herein with respect to FIGS. 4 and 5, the incidents clusters 106 may be used generate a non-static prediction model. In this regard, the incidents clusters of the prediction model may be re-determined with respect to new incidents.

The apparatus 100 may include an incident predictor 108 that is executed by at least one hardware processor (e.g., the hardware processor 1902 of FIG. 19, and/or the hardware processor 2104 of FIG. 21) to ascertain a new incident 110. The incident predictor 108 may assign the new incident 110 to an incidents cluster (i.e., an assigned incidents cluster 112) of the plurality of incidents clusters 106. In this regard, the incidents clusters may be re-determined with respect to new incidents. That is, the assignment of the new incident 110 to an incidents cluster may be based on first re-determination of the incidents clusters, and then assignment of the new incident 110 to the re-determined incidents clusters, which presumably correspond to the previously determined incidents clusters. Further, the incident predictor 108 may determine, for the assigned incidents cluster 112, at least one further predicted incident 114 associated with at least one further corresponding incidents cluster 116. The at least one further corresponding incidents cluster 116 may be determined from the plurality of incidents clusters 106.

The apparatus 100 may include an incident preventer 118 that is executed by at least one hardware processor (e.g., the hardware processor 1902 of FIG. 19, and/or the hardware processor 2104 of FIG. 21) to determine a resolution 120 to the at least one further predicted incident 114. Further, the incident preventer 118 may prevent occurrence of the at least one further predicted incident 114 by executing the determined resolution 120 to the at least one further predicted incident 114. Alternatively or additionally, an alert 122 may be generated to support personnel, and/or a display of predicted incidents, their proposed resolutions, and an estimated time of occurrence of the predicted incidents may be generated.

According to examples disclosed herein, the incident analyzer 102 is executed by the at least one hardware processor to cluster the plurality of past incidents 104 to generate the plurality of incidents clusters 106 by performing unsupervised clustering of the past incidents 104 to generate the plurality of incidents clusters 106.

According to examples disclosed herein, the incident analyzer 102 is executed by the at least one hardware processor to generate, based on the identification of the time of occurrence of each past incident of the plurality of past incidents 104 that is in the respective incidents cluster of the plurality of incidents clusters 106, a time-based cluster relationship between each incidents cluster of the plurality of incidents clusters 106.

According to examples disclosed herein, the incident analyzer 102 is executed by the at least one hardware processor to determine, based on a number of time-based connections between each incidents cluster of the plurality of incidents clusters 106, a strength of the time-based cluster relationship between each incidents cluster of the plurality of incidents clusters 106.

According to examples disclosed herein, the incident predictor 108 is executed by the at least one hardware processor to determine, for the assigned incidents cluster, at least one further predicted incident 114 associated with at least one further corresponding incidents cluster 116 by analyzing the strength of the time-based cluster relationship between the assigned incidents cluster 112 and each downstream incidents cluster relative to the assigned incidents cluster 112, and identifying, based on the analysis of the strength of the time-based cluster relationship between the assigned incidents cluster 112 and each downstream incidents cluster relative to the assigned incidents cluster 112, a strongest time-based cluster relationship between the assigned incidents cluster 112 and a downstream incidents cluster.

According to examples disclosed herein, the incident predictor 108 is executed by the at least one hardware processor to assign the new incident 110 to the incidents cluster of the plurality of incidents clusters 106 by determining, with respect to the new incident 110, a score for each incidents cluster of the plurality of incidents clusters 106, and assigning the new incident 110 to the incidents cluster of the plurality of incidents clusters 106 that includes a highest determined score.

According to examples disclosed herein, the incident predictor 108 is executed by the at least one hardware processor to determine, based on analysis of the time of occurrence of selected past incidents from the assigned incidents cluster and the at least one further corresponding incidents cluster 116, an estimated time of occurrence 124 of the at least one further predicted incident 114.

According to examples disclosed herein, the incident preventer 118 is executed by the at least one hardware processor to execute the determined resolution 120 to the at least one further predicted incident 114 prior to expiration of the estimated time of occurrence 124 of the at least one further predicted incident 114.

According to examples disclosed herein, the incident predictor 108 is executed by the at least one hardware processor to determine, by averaging a difference between an earliest time of occurrence and a difference between a latest time of occurrence of selected past incidents from the assigned incidents cluster 112 and the at least one further corresponding incidents cluster 116, the estimated time of occurrence 124 of the at least one further predicted incident 114.

According to examples disclosed herein, the incident predictor 108 is executed by the at least one hardware processor to determine, by dividing a difference between an earliest time of occurrence and a difference between a latest time of occurrence of selected past incidents from the assigned incidents cluster 112 and the at least one further corresponding incidents cluster 116 by a size of a strongest outgoing edge between the assigned incidents cluster 112 and the at least one further corresponding incidents cluster 116, the estimated time of occurrence 124 of the at least one further predicted incident 114.

Figure 2:
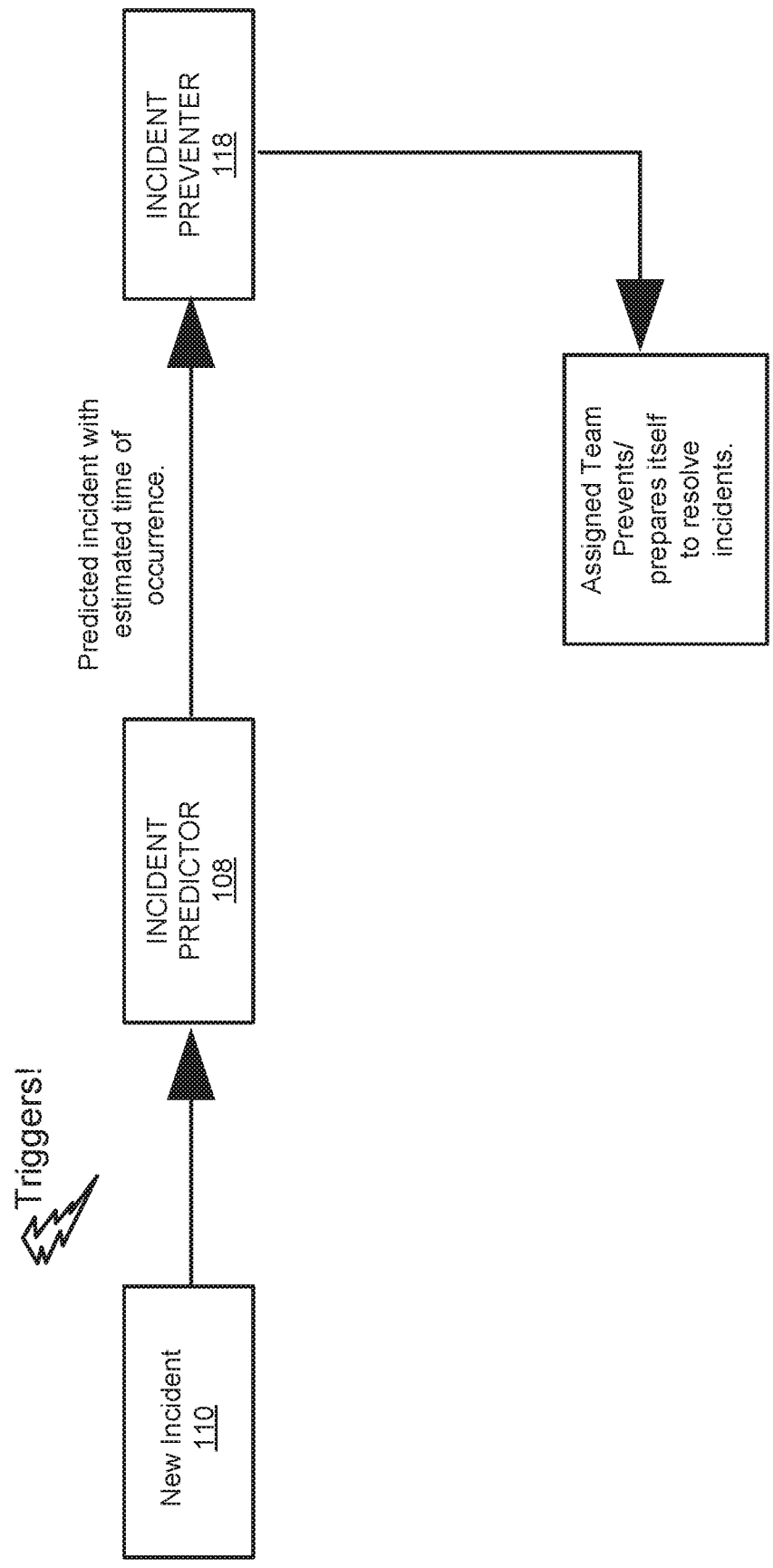
FIG. 2 illustrates a logical flow of a use case to illustrate operation of the incident prediction and prevention apparatus of FIG. 1 in accordance with an example of the present disclosure.

FIG. 2 illustrates a logical flow of a use case to illustrate operation of the apparatus 100 in accordance with an example of the present disclosure.

Referring to FIG. 2, when a new incident 110 is reported, the incident predictor 108 may assign the new incident 110 to an incidents cluster (i.e., an assigned incidents cluster 112) of the plurality of incidents clusters 106. Further, the incident predictor 108 may determine, for the assigned incidents cluster 112, at least one further predicted incident 114 associated with at least one further corresponding incidents cluster 116. The incident predictor 108 may determine, based on analysis of the time of occurrence of selected past incidents from the assigned incidents cluster and the at least one further corresponding incidents cluster 116, an estimated time of occurrence 124 of the at least one further predicted incident 114.

The incident preventer 118 may determine the resolution 120 to the at least one further predicted incident 114. Further, the incident preventer 118 may prevent occurrence of the at least one further predicted incident 114 by executing the determined resolution 120 to the at least one further predicted incident 114. Alternatively or additionally, the alert 122 may be generated to support personnel, and/or a display of predicted incidents, their proposed resolutions, and an estimated time of occurrence of the predicted incidents may be generated. In this regard, an assigned team may prevent and/or prepare for resolution of incidents.

The incident preventer 118 may thus provide an expedited resolution capability to a system that includes or operates with the apparatus 100. For example, when the new incident 110 occurs, the incident preventer 118 may identify those in a team who may resolve a predicted incident that is likely to occur in the future. Thus, the incident preventer 118 may determine a specific team that is to resolve the predicted incident. With respect to expedited resolution (i.e., executing the determined resolution 120 to the at least one further predicted incident 114), some of the predicted incidents may include a rule attachment. For example, an incident may include a rule that specifies starting or stopping of a server. Such rules may be ascertained based on resolution of past incidents, or from other sources. In this regard, the rule may be implemented by the incident preventer 118 so that assistance is not required (e.g., the incident is automatically resolved by implementation of the rule to thus implement an expedited resolution process).

Figure 3:
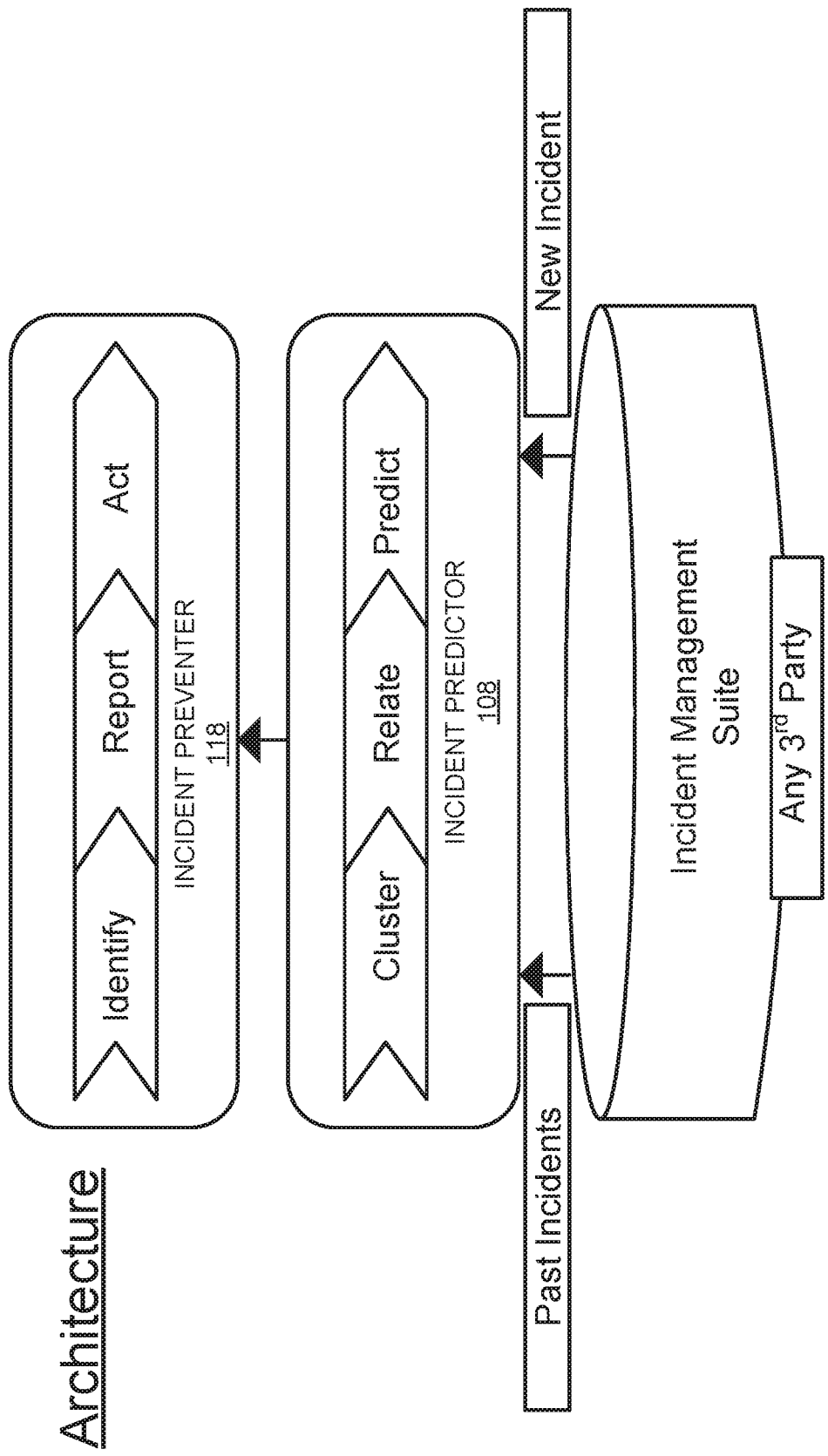
FIG. 3 illustrates an architecture associated with the incident prediction and prevention apparatus of FIG. 1 in accordance with an example of the present disclosure.

FIG. 3 illustrates an architecture associated with the apparatus 100 in accordance with an example of the present disclosure.

Referring to FIG. 3, the architecture associated with the apparatus 100 may represent a pluggable architecture. In this regard, various components (e.g., the incident predictor 108, the incident preventer 118, etc.) of the apparatus may be plugged into an incident management tool.

FIG. 4 illustrates an incident predictor of the apparatus 100 in accordance with an example of the present disclosure.

Referring to FIG. 4, in order to generate a prediction model 400, the incident analyzer 102 may ascertain a plurality of past incidents 104. The incident analyzer 102 may cluster the plurality of past incidents 104 to generate the plurality of incidents clusters 106. The clustering may be performed, for example, by K-means, etc., and, according to an example, is unsupervised. For example, a set of swiping related incidents may be clustered in one incidents cluster. Similarly, a set of hardware related incidents may be clustered in another incidents clusters, etc. Each incidents cluster may represent a bucket of incidents. The incident analyzer 102 may further identify, for each past incident of the plurality of past incidents 104 that is in a respective incidents cluster of the plurality of incidents clusters 106, a time of occurrence. That is, for the incident clusters (e.g., buckets), a time based cluster relationship may be established to generate the prediction model 400.

FIG. 5 illustrates further details of the incident predictor of the apparatus 100 in accordance with an example of the present disclosure.

Referring to FIG. 5, when a new incident 110 is ascertained, the prediction model 400 may analyze the new incident 110 to determine the incidents cluster (e.g., bucket) to which the new incident 110 belongs. A new incident 110 may belong to more than one incidents cluster. The incidents cluster to which the new incident 110 is assigned may be selected based on certain parameters.

For example, a new incident related to a credit card swipe may belong to more than one incidents cluster. For example, the new incident may belong to a swipe related incidents cluster as well as a credit card related incidents cluster. In this regard, the closest incidents cluster may be determined, and the incident and its type may be predicted by the prediction model 400. The incident predictor 108 may determine, along with the new incident 110, a score for each newly formed incidents cluster (as the prediction model 400 is updated) of the plurality of incidents clusters 106, and assign the new incident 110 to the incidents cluster of the plurality of incidents clusters 106 that includes a highest determined score.

The prediction model 400 may need to be constructed and/or updated based on incidents (both past and new) to determine a cluster for the new incident. Past incidents and the new incident 110 may be received as inputs to a clustering algorithm (e.g., k-means). The output of the clustering algorithm may include clusters of incidents (including the incidents clusters 106). If the new incident falls in more than one incidents cluster, then the incidents cluster with the highest cluster score may be selected for assignment. The clustering algorithm may eliminate the technical challenges associated with categorization of incidents. Each cluster in the prediction model (incident clusters) may then be updated with time-based relationships for incident prediction and estimated time of occurrence as disclosed herein.

Figure 6:
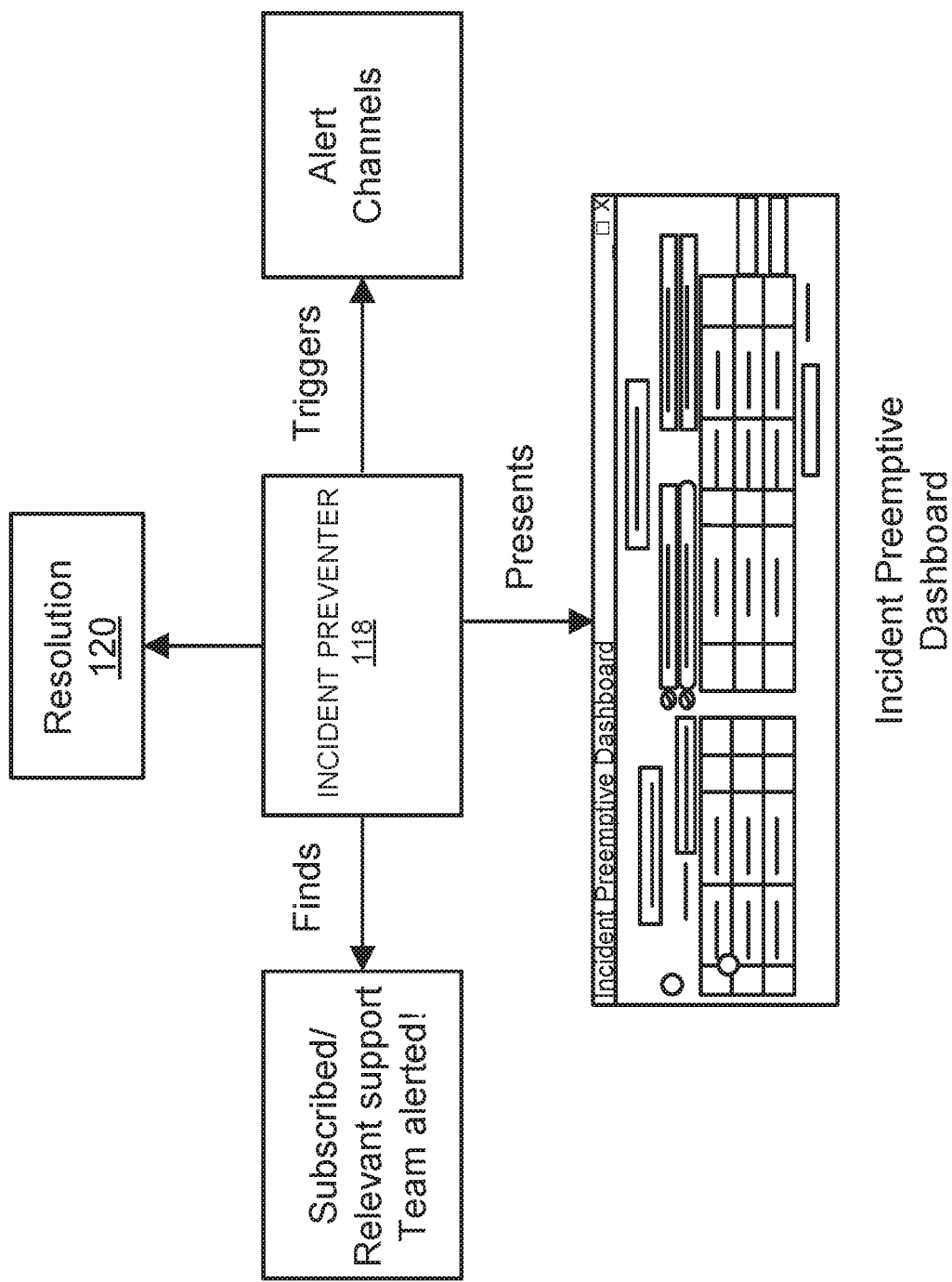
FIG. 6 illustrates an incident preventer of the incident prediction and prevention apparatus of FIG. 1 in accordance with an example of the present disclosure.

FIG. 6 illustrates an incident preventer of the apparatus 100 in accordance with an example of the present disclosure.

Referring to FIG. 6, the incident preventer 118 may provide guidance such as an identification of subscribed and/or relevant support team members to address a predicted incident, triggers (e.g., SMS, mail, telephone, etc.) with respect to the predicted incident, and/or an incident preemptive display associated with the predicted incident and related aspects. Further, the incident preventer 118 may determine the resolution 120 to the at least one further predicted incident 114, and prevent occurrence of the at least one further predicted incident 114 by executing the determined resolution 120 to the at least one further predicted incident 114.

Figure 7:
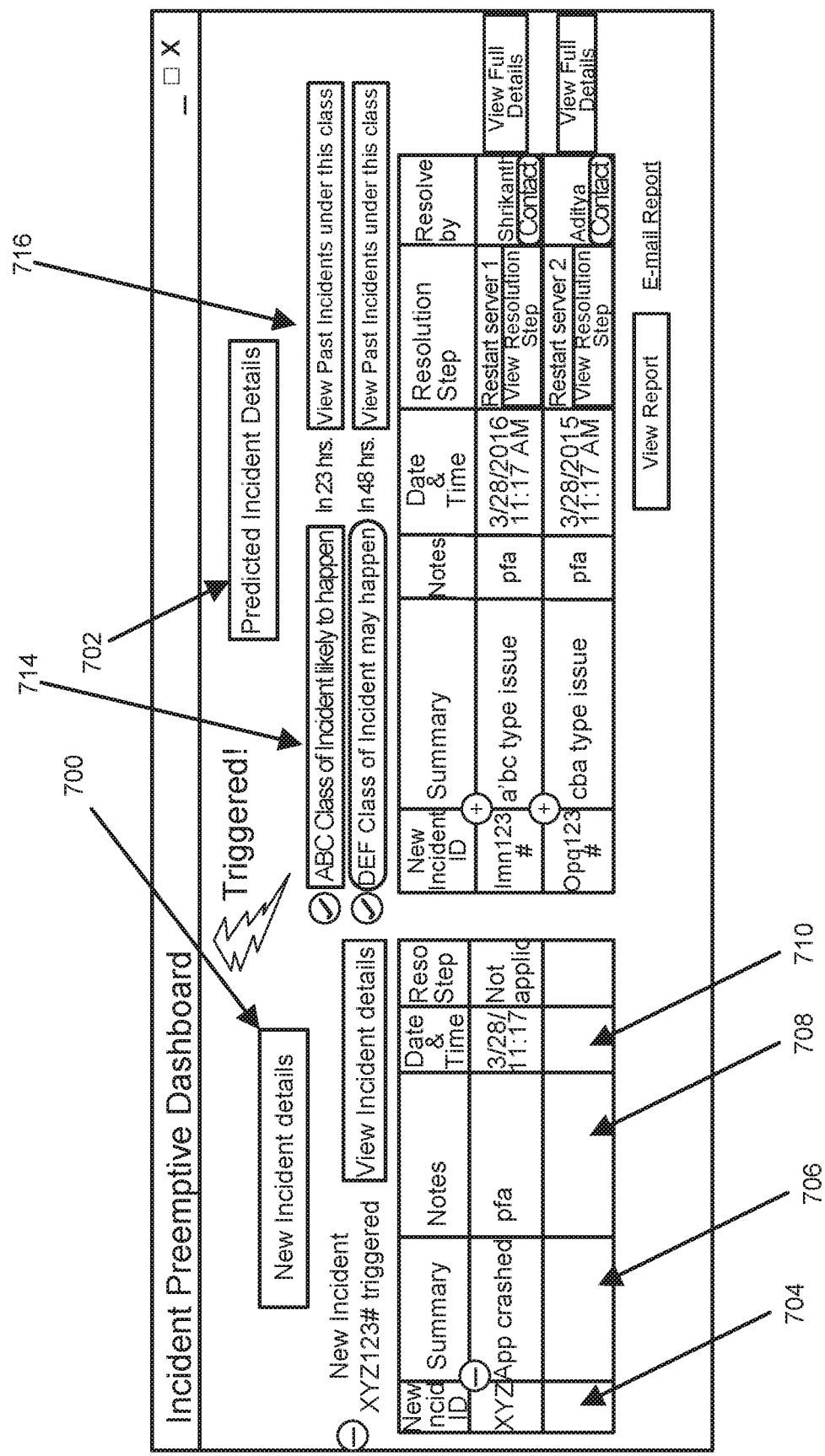
FIG. 7 illustrates a dashboard associated with the incident preventer of the incident prediction and prevention apparatus of FIG. 1 in accordance with an example of the present disclosure.

FIG. 7 illustrates a dashboard associated with the incident preventer of the apparatus 100 in accordance with an example of the present disclosure.

Referring to FIG. 7, the details related to the new incident 110 may be specified at 700, and details related to the predicted incident 114 may be specified at 702. The predicted incident details may include additional information such as the resolution step and/or an executable rule for resolution guidance provided by the incident preventer 118, and an identity of an individual and/or team that performs the resolution.

The new incident details may include an incident identification (ID) at 704, a summary of the new incident at 706, further new incident attributes at 708, and a date/time of the new incident at 710.

With respect to the predicted incident details, predicted incidents may be specified at 714. For the example of FIG. 7, the predicted incidents may include an "ABC Class" of incident likely to occur in twenty-three hours, and a "DEF Class" of incident likely to occur in forty-eight hours, etc. Past incidents associated with the "ABC Class" and the "DEF Class" may also be specified at 716.

Figure 8:
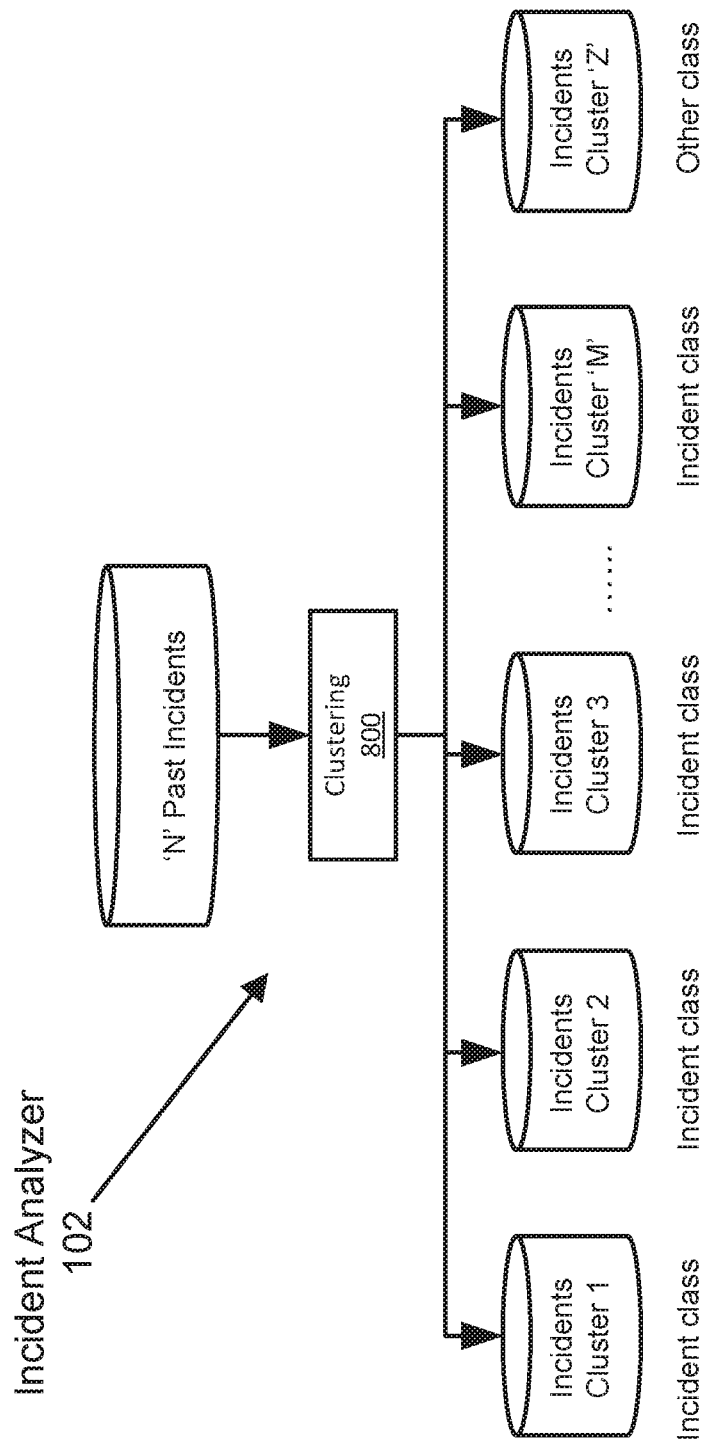
FIG. 8 illustrates incident clustering to illustrate operation of the incident prediction and prevention apparatus of FIG. 1 in accordance with an example of the present disclosure.

FIG. 8 illustrates incident clustering to illustrate operation of the apparatus 100 in accordance with an example of the present disclosure.

At block 800, the incident analyzer 102 may cluster the plurality of past incidents 104 to generate a plurality of incidents clusters 106. For example, the incident analyzer 102 may perform clustering on 'N' past incidents. The clustered incidents may be clustered according to incident classes. For example, the incident classes may include incidents for cluster 1, incidents for cluster 2, etc. An incident may also not belong to any of the incident classes. Further, an incident may also belong to more than one incidents cluster.

Figure 9:
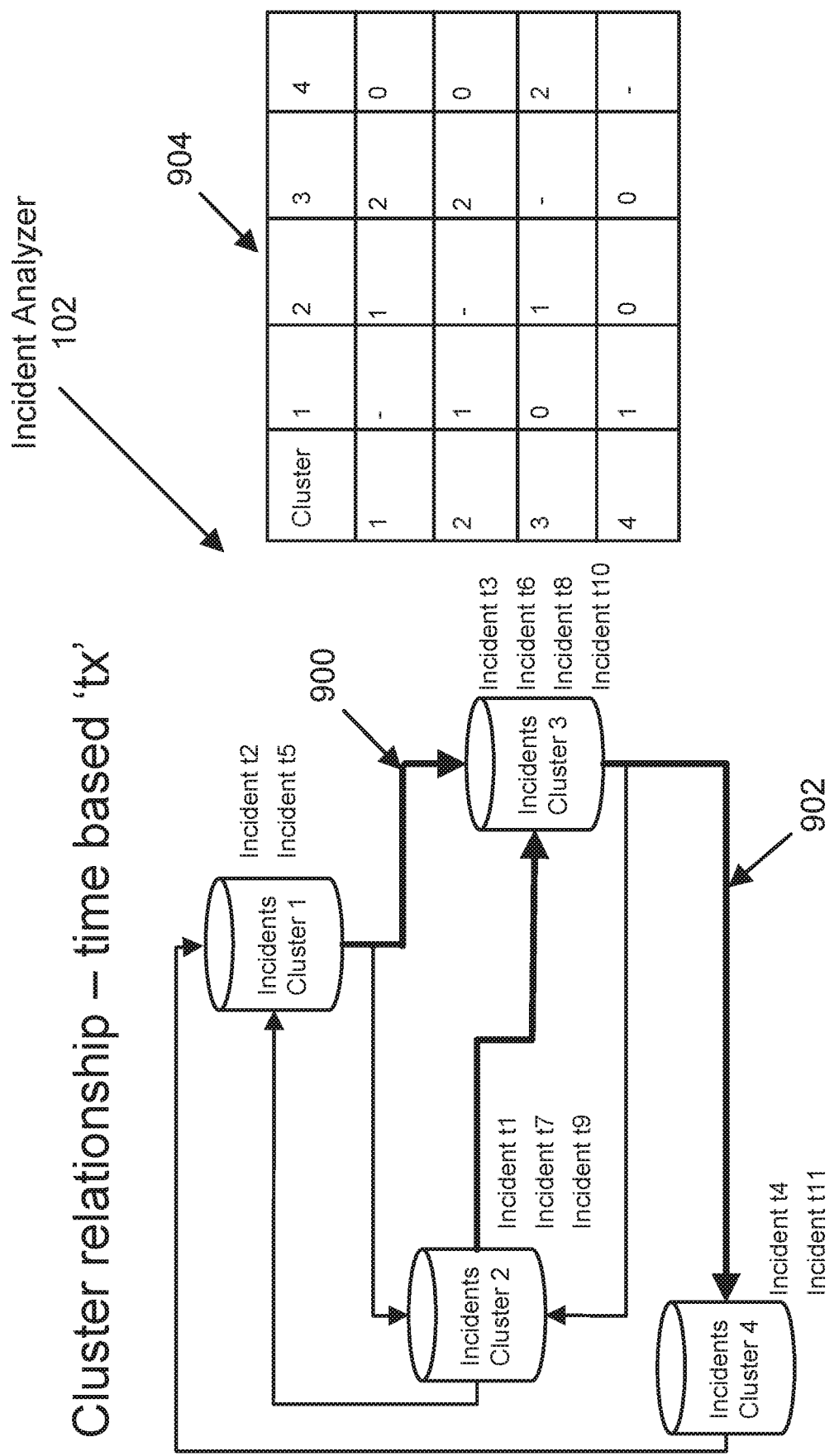
FIG. 9 illustrates cluster relationship determination to illustrate operation of the incident prediction and prevention apparatus of FIG. 1 in accordance with an example of the present disclosure.

FIG. 9 illustrates cluster relationship determination to illustrate operation of the apparatus 100 in accordance with an example of the present disclosure.

The incident analyzer 102 may further identify, for each past incident of the plurality of past incidents 104 that is in a respective incidents cluster of the plurality of incidents clusters 106, a time of occurrence. In order to establish relationships between incidents clusters, a time based relationship may be evaluated between incidents of the incidents clusters. For example, with respect to incidents cluster 1 and incidents cluster 3, a time based relationship may be evaluated between incidents of the incidents clusters. For incidents cluster 1, incidents may occur at times t2 and t5. For incidents cluster 3, incidents may occur at times t2, t3, t6, and t10. In this regard, with reference to incidents cluster 1, an incident at time t3 may follow the incident at time t2. However, the incident at time t3 is included in incidents cluster 3. Thus an edge at 900 may be included between incidents cluster 1 and incidents cluster 3. In the same manner, an incident at time t4 may follow the incident at time t3. However, the incident at time t4 is included in incidents cluster 4. Thus an edge at 902 may be included between incidents cluster 3 and incidents cluster 4. In this manner, edges may gain thickness depending on the number of incidents that are sequentially related between two clusters.

The number of connections between different incidents clusters may be included in a table format in a cluster relationship table 904. For example, row 2 (incidents cluster 2) and column 3 (incidents cluster 3) of the cluster relationship table may include 2 links (e.g., a link from incident t2 to t3, and a link from incident t5 to t6).

Figure 10:
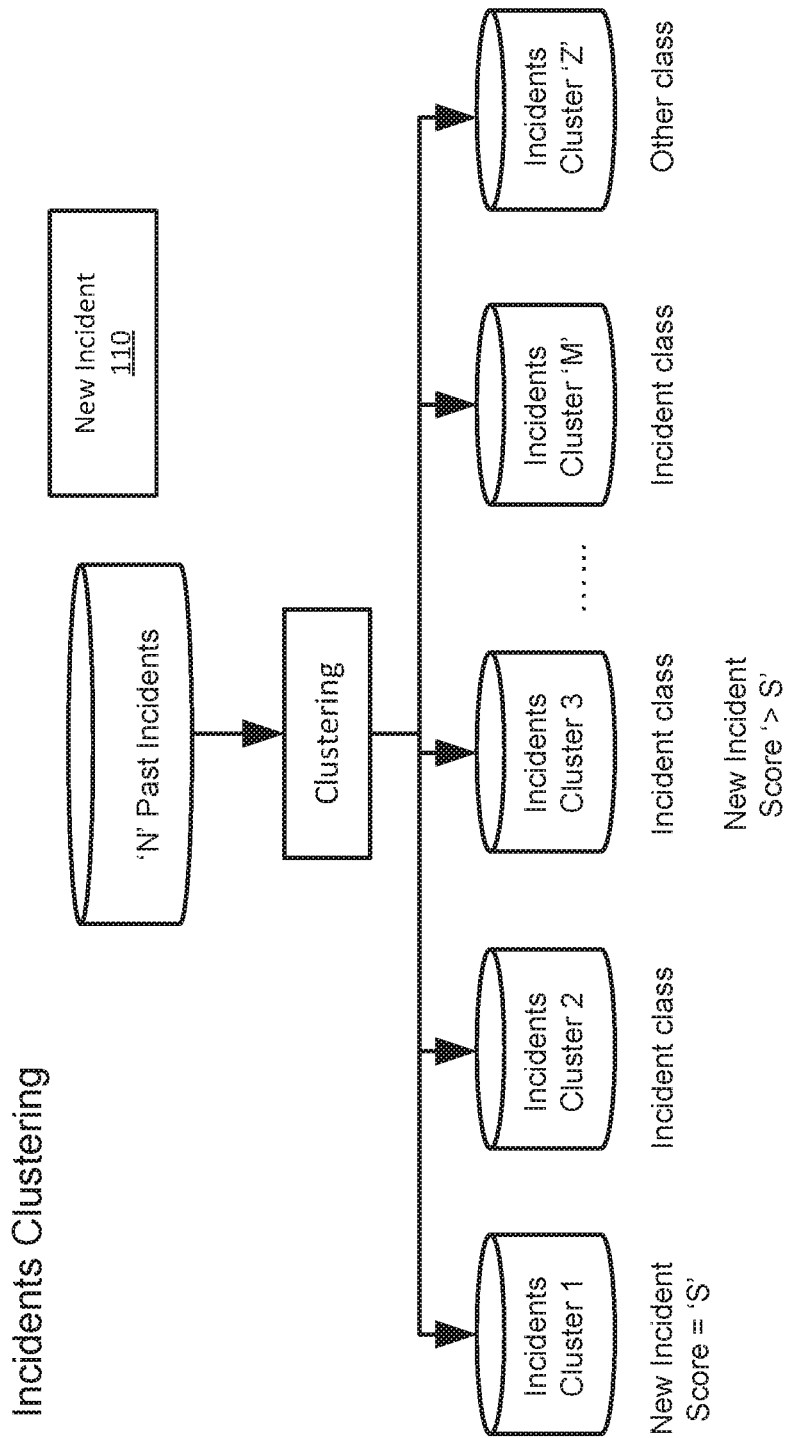
FIG. 10 illustrates new incident assessment to illustrate operation of the incident prediction and prevention apparatus of FIG. 1 in accordance with an example of the present disclosure.

FIG. 10 illustrates new incident assessment to illustrate operation of the apparatus 100 in accordance with an example of the present disclosure.

With respect to the prediction model 400, referring to FIGS. 8 and 10, a new incident 110 may be received. Each incidents cluster may be assigned a cluster score (S) by the unsupervised clustering algorithm. In situations when the new incident is found to belong in more than one incidents cluster, the cluster score (S) may be used as the deciding parameter. That is, the incidents cluster with the highest 'S' score may be assigned for the new incident. Thus, the prediction model 400 may use scores of clusters with respect to the incidents clusters to assign the new incident 110 to one of the incidents clusters. In this regard, for the example of FIG. 10, for incidents cluster 1, the new incident may be assigned a score of 'S', and for incidents cluster 3, the new incident may be assigned a score greater than 'S'. Thus, the new incident 110 may be assigned to incidents cluster 3.

Figure 11:
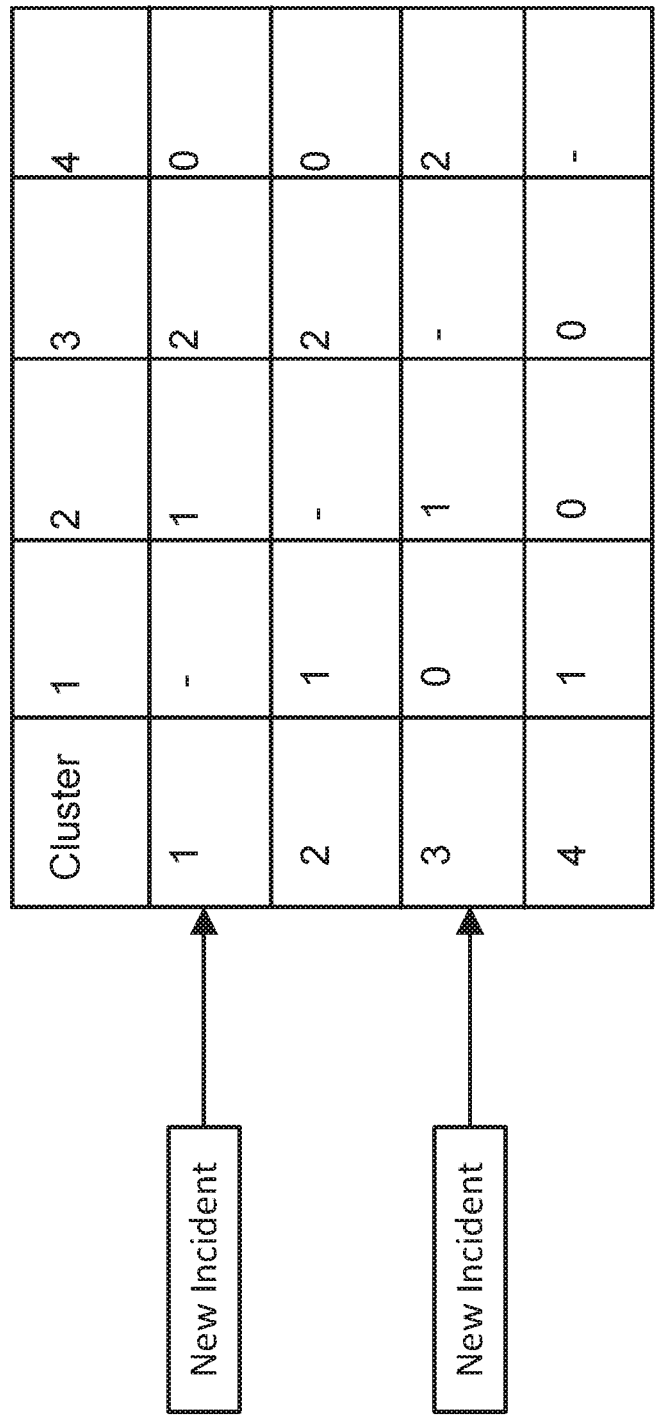
FIG. 11 illustrates incident class prediction for a new incident to illustrate operation of the incident prediction and prevention apparatus of FIG. 1 in accordance with an example of the present disclosure.

FIG. 11 illustrates incident class prediction for a new incident to illustrate operation of the apparatus 100 in accordance with an example of the present disclosure.

The table 904 of FIG. 9 may be modified as shown in FIG. 11 to include the new incident 110, for example, for incidents cluster 3 based on the higher score. The score may represent a machine learning based cluster score. The machine learning based cluster score may represent a cluster purity score. The cluster purity score may be determined based on evaluation of intra cluster distances (i.e., centroid to centroid distances) between different clusters. For example, the cluster purity score may be determined as a ratio of an intra cluster distance to an inter cluster distance. The intra cluster distance may be determined as a function of distances of objects to cluster centroids. Thus, the cluster score 'S' may signify the quality/purity of a cluster as decided by the clustering algorithm. The new incident and past incidents may be sent to a clustering algorithm (e.g., K-means, etc., as disclosed herein with respect to FIG. 5) to produce incidents clusters. The cluster score 'S' may be implicitly assigned by the respective algorithm used for each incidents cluster. The cluster score implementation may vary depending upon the algorithm used.

Figure 12:
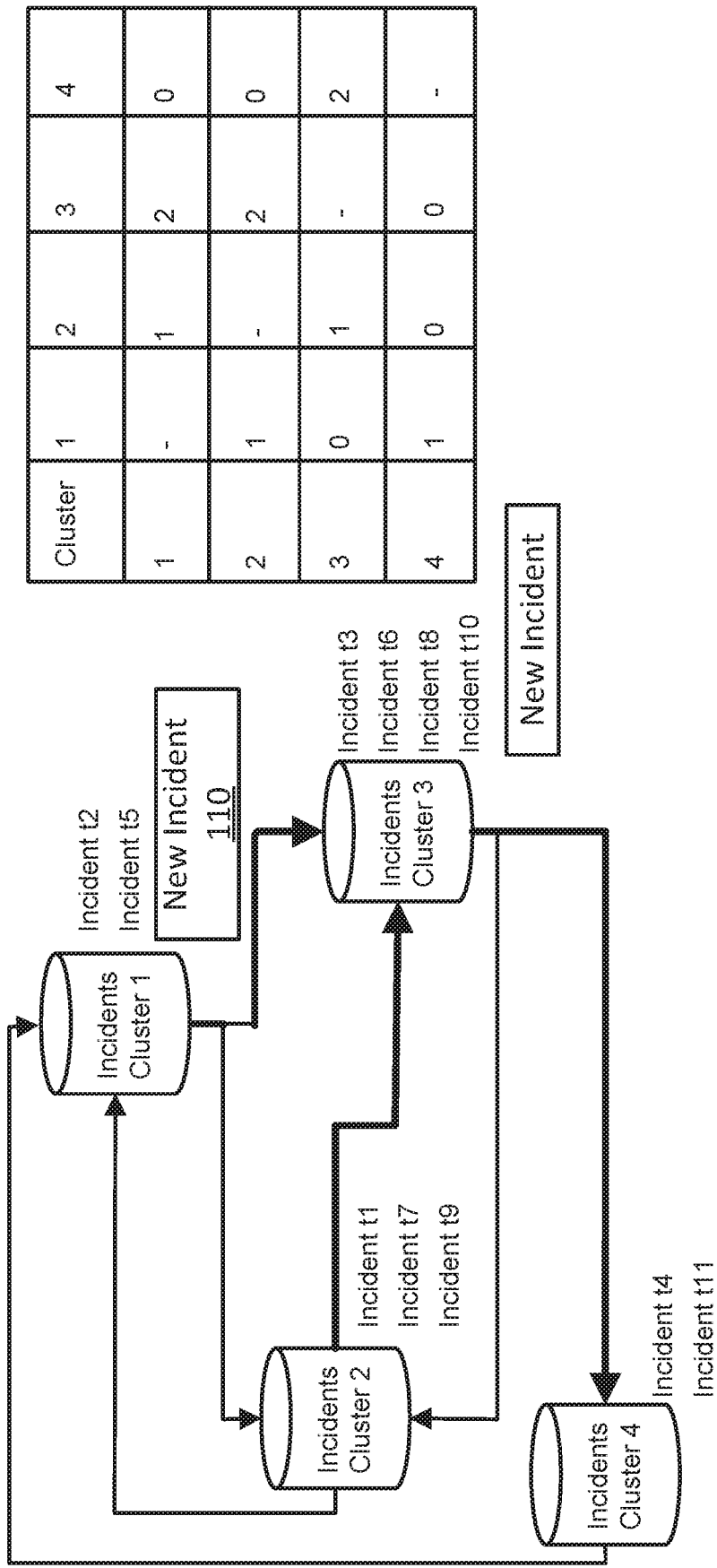
FIG. 12 illustrates further details of incident class prediction for a new incident to illustrate operation of the incident prediction and prevention apparatus of FIG. 1 in accordance with an example of the present disclosure.

FIG. 12 illustrates further details of incident class prediction for a new incident to illustrate operation of the apparatus 100 in accordance with an example of the present disclosure.

Referring to FIG. 12, the new incident 110 (from FIG. 10) may belong to incidents cluster 1 or incidents cluster 3. However, based on the higher score for incidents cluster 3, the new incident 110 may be assigned to incidents cluster 3.

Once the new incident 110 is assigned to incidents cluster 3, the incident predictor 108 may determine which further incidents cluster or incidents clusters may be relevant as a result of occurrence of the new incident. For example, incidents cluster 3 may include links to downstream incidents cluster 2 and incidents cluster 4. Assuming that the new incident 110 is a debit card swipe issue, and the new incident belongs to incidents cluster 3 related to debit card swipe issues, incidents cluster 2 may represent a payment mismatch cluster, and incidents cluster 4 may represent debit card acceptance issues. Since the link between incidents clusters 3 and 4 is stronger (e.g., thicker) than incidents clusters 3 and 2, the incident predictor 108 may predict incidents related to incidents cluster 4 as the downstream cluster that may result due to occurrence of the new incident.

Figure 13:
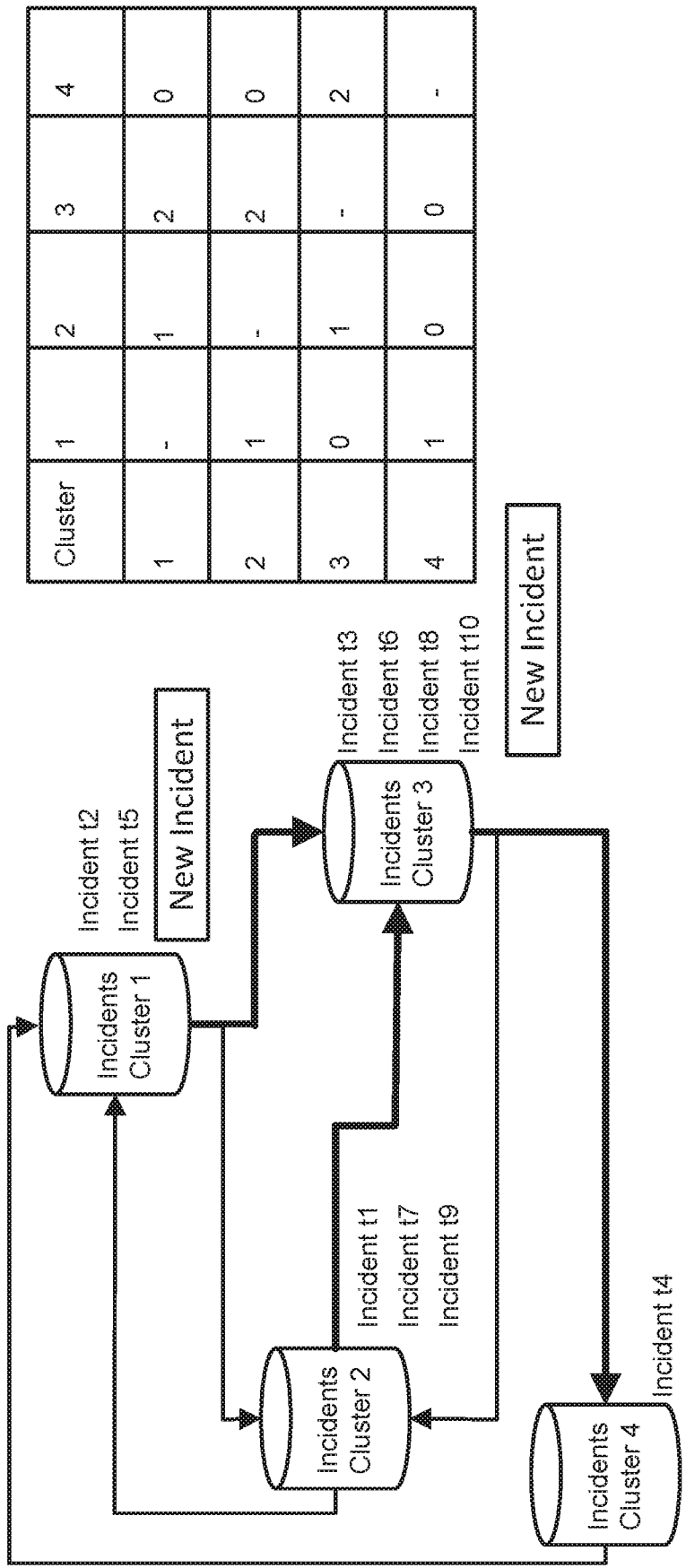
FIG. 13 illustrates estimated time of occurrence determination to illustrate operation of the incident prediction and prevention apparatus of FIG. 1 in accordance with an example of the present disclosure.

FIG. 13 illustrates estimated time of occurrence determination to illustrate operation of the apparatus 100 in accordance with an example of the present disclosure.

Referring to FIG. 13, in order to estimate the time of occurrence of the predicted incident, the incident predictor 108 may determine an estimated time of occurrence 124 (Et) between incidents clusters 3 and 4. For example, the estimated time of occurrence 124 between incidents clusters 3 and 4 may be determined as follows:

$$Et=\{\{(t4-t3)+(t11-t10)]/2\}$$

The estimated time of occurrence 124 may be based on a relationship between two incidents clusters. The estimated time of occurrence 124 may represent a minimum time that is available to address a predicted future incident.

Figure 14:
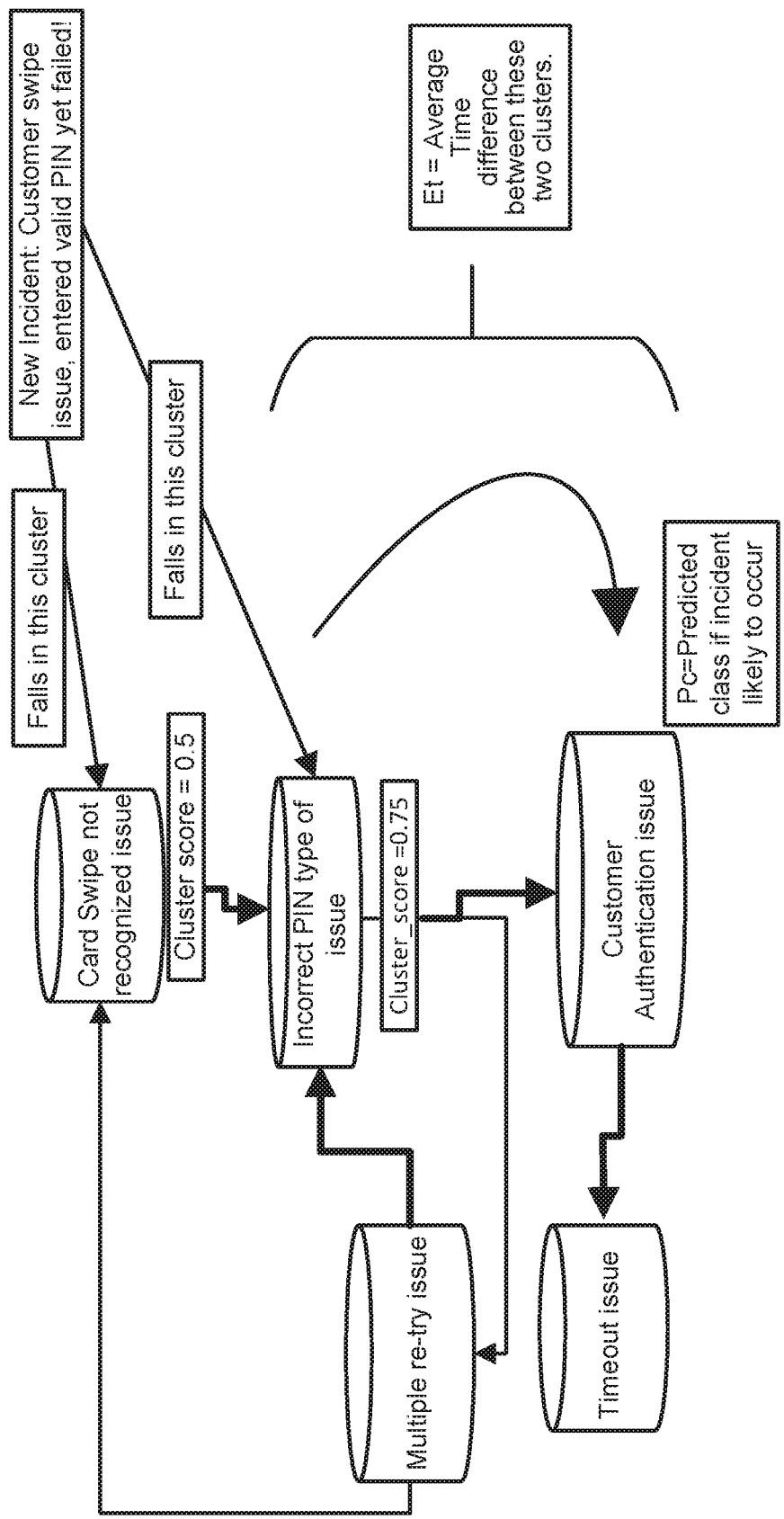
FIG. 14 illustrates cluster score determination for a new incident to illustrate operation of the incident prediction and prevention apparatus of FIG. 1 in accordance with an example of the present disclosure.

FIG. 14 illustrates cluster score determination for a new incident to illustrate operation of the apparatus 100 in accordance with an example of the present disclosure.

Referring to FIG. 13, assuming that a new incident represents a customer swipe issue (e.g., customer swipe issue, entered valid PIN yet failed), the new incident may be assigned to the "incorrect PIN type of issue" incidents cluster that includes a cluster score of 0.75 (compared to the "card swipe not recognized issue" incidents cluster that includes a cluster score of 0.5). Thereafter, the incident predictor 108 may predict, based on the edge thickness between downstream clusters, incidents related to the "customer authentication issue" incidents cluster (as opposed to the "multiple re-try issue" cluster) as the downstream cluster that may result due to occurrence of the new incident. In this regard, the incident predictor 108 may further determine the estimated time of occurrence 124 between incidents clusters "incorrect PIN type of issue" and "customer authentication issue". The estimated time of occurrence 124 may represent the time in which the "customer authentication issue" may be predicted to occur.

FIG. 15 illustrates determination of predicted class of incidents and estimated time of occurrence to illustrate operation of the apparatus 100 in accordance with an example of the present disclosure.

Referring to FIG. 15, the incident predictor 108 may assign the new incident 110 (e.g. "Inew") to an incidents cluster (i.e., an assigned incidents cluster 112) of the plurality of incidents clusters 106. Further, the incident predictor 108 may determine, for the assigned incidents cluster 112, at least one further predicted incident 114 (e.g., "Pc") associated with at least one further corresponding incidents cluster 116.

Further, with respect to the estimated time of occurrence 124, the incident predictor 108 may determine, based on analysis of the time of occurrence of selected past incidents from the assigned incidents cluster and the at least one further corresponding incidents cluster 116, the estimated time of occurrence 124 (e.g., Et) of the at least one further predicted incident 114. As shown in FIG. 15, the Et may be determined by dividing a difference between an earliest time of occurrence and a difference between a latest time of occurrence of selected past incidents from the assigned incidents cluster 112 and the at least one further corresponding incidents cluster 116 by a size of a strongest (e.g., thickest) outgoing edge between the assigned incidents cluster 112 and the at least one further corresponding incidents cluster 116.

FIGS. 16-18 illustrate pseudocode to illustrate operation of the apparatus 100 in accordance with an example of the present disclosure.

Referring to FIG. 16, the pseudocode of FIG. 16 may generate the prediction model 400. The pseudocode of FIGS. 17 and 18 may determine the predicted incident 114.

Figure 19:
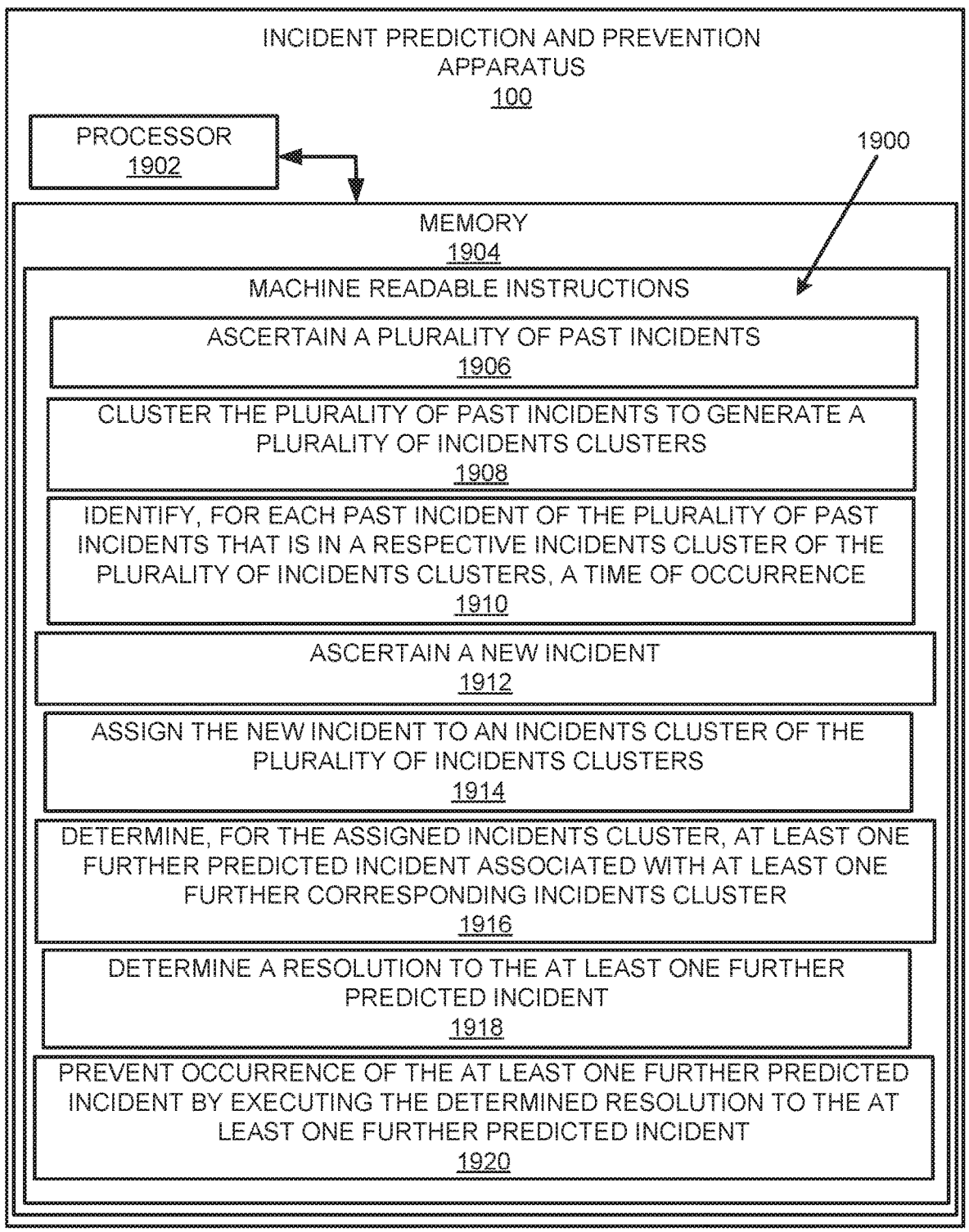
FIG. 19 illustrates an example block diagram for incident prediction and prevention in accordance with an example of the present disclosure.
Figure 20:
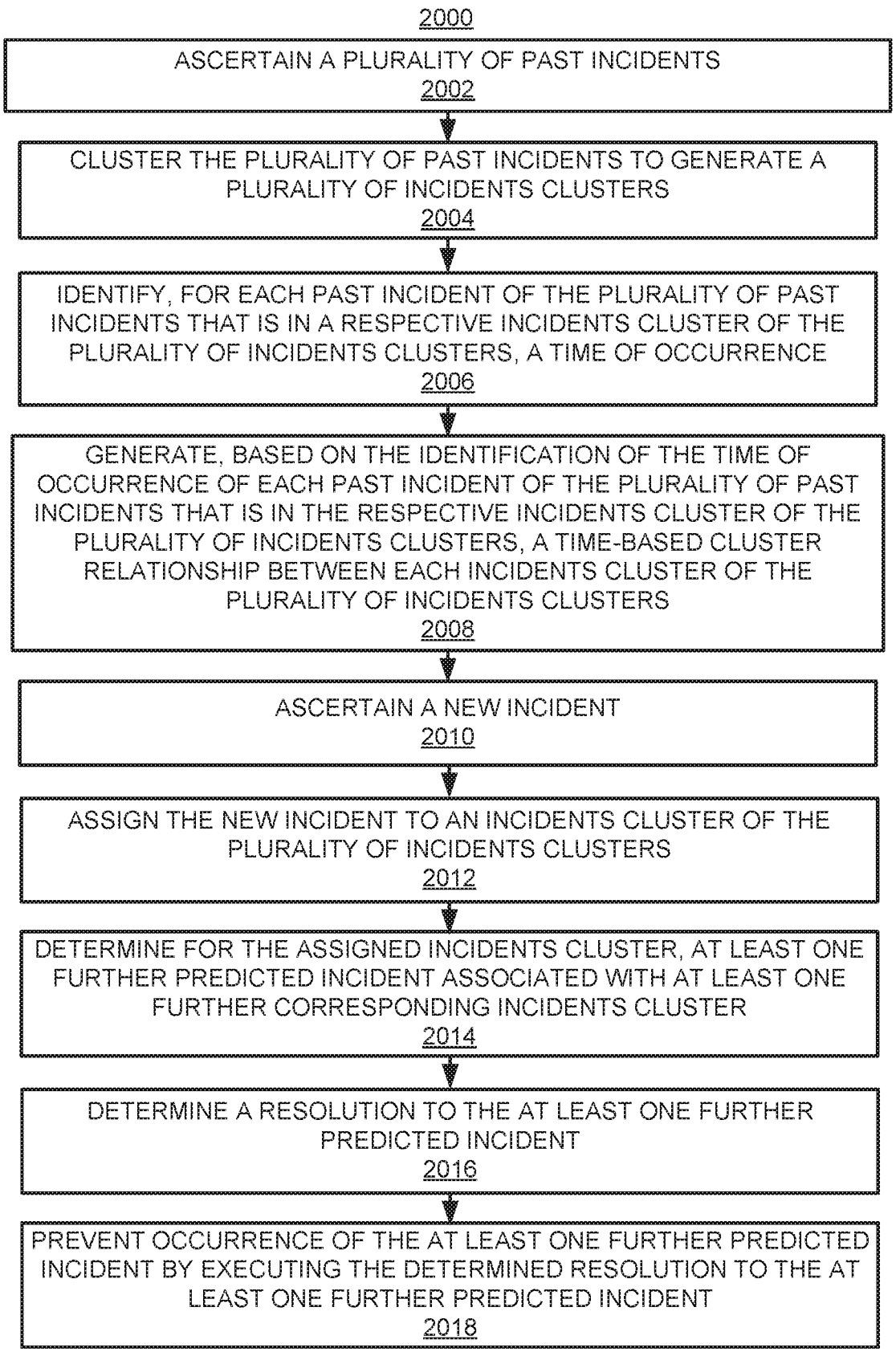
FIG. 20 illustrates a flowchart of an example method for incident prediction and prevention in accordance with an example of the present disclosure.
Figure 21:
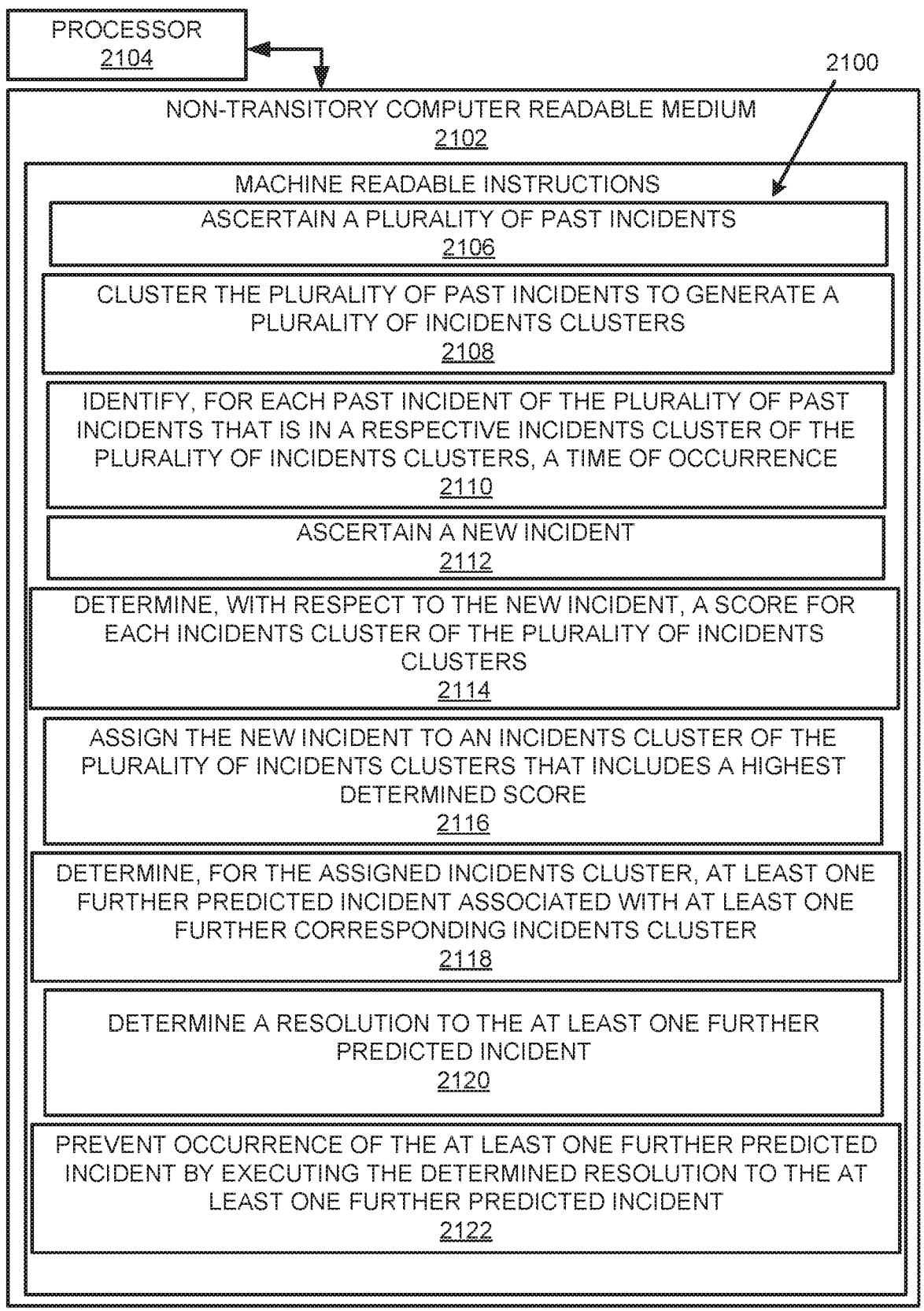
FIG. 21 illustrates a further example block diagram for incident prediction and prevention in accordance with another example of the present disclosure.

FIGS. 19-21 respectively illustrate an example block diagram 1900, a flowchart of an example method 2000, and a further example block diagram 2100 for incident prediction and prevention, according to examples. The block diagram 1900, the method 2000, and the block diagram 2100 may be implemented on the apparatus 100 described above with reference to FIG. 1 by way of example and not of limitation. The block diagram 1900, the method 2000, and the block diagram 2100 may be practiced in other apparatus. In addition to showing the block diagram 1900, FIG. 19 shows hardware of the apparatus 100 that may execute the instructions of the block diagram 1900. The hardware may include a processor 1902, and a memory 1904 storing machine readable instructions that when executed by the processor cause the processor to perform the instructions of the block diagram 1900. The memory 1904 may represent a non-transitory computer readable medium. FIG. 20 may represent an example method for incident prediction and prevention, and the steps of the method. FIG. 21 may represent a non-transitory computer readable medium 2102 having stored thereon machine readable instructions to provide incident prediction and prevention according to an example. The machine readable instructions, when executed, cause a processor 2104 to perform the instructions of the block diagram 2100 also shown in FIG. 21.

The processor 1902 of FIG. 19 and/or the processor 2104 of FIG. 21 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2102 of FIG. 21), such as hardware storage devices (e.g., RAM (random access memory), ROM (read only memory), EPROM (erasable, programmable ROM), EEPROM (electrically erasable, programmable ROM), hard drives, and flash memory). The memory 1904 may include a RAM, where the machine readable instructions and data for a processor may reside during runtime.

Referring to FIGS. 1-19, and particularly to the block diagram 1900 shown in FIG. 19, the memory 1904 may include instructions 1906 to ascertain (e.g., by the incident analyzer 102 that is executed by at least one hardware processor) a plurality of past incidents 104.

The processor 1902 may fetch, decode, and execute the instructions 1908 to cluster (e.g., by the incident analyzer 102 that is executed by at least one hardware processor) the plurality of past incidents 104 to generate a plurality of incidents clusters 106.

The processor 1902 may fetch, decode, and execute the instructions 1910 to identify (e.g., by the incident analyzer 102 that is executed by at least one hardware processor), for each past incident of the plurality of past incidents 104 that is in a respective incidents cluster 116 of the plurality of incidents clusters 106, a time of occurrence.

The processor 1902 may fetch, decode, and execute the instructions 1912 to ascertain (e.g., by the incident predictor 108 that is executed by the at least one hardware processor) a new incident 110.

The processor 1902 may fetch, decode, and execute the instructions 1914 to assign (e.g., by the incident predictor 108 that is executed by the at least one hardware processor) the new incident 110 to an incidents cluster 116 of the plurality of incidents clusters 106.

The processor 1902 may fetch, decode, and execute the instructions 1916 to determine (e.g., by the incident predictor 108 that is executed by the at least one hardware processor), for the assigned incidents cluster 112, at least one further predicted incident 114 associated with at least one further corresponding incidents cluster. The at least one further corresponding incidents cluster may be determined from the plurality of incidents clusters 106.

The processor 1902 may fetch, decode, and execute the instructions 1918 to determine (e.g., by the incident preventer 118 that is executed by the at least one hardware processor) a resolution 120 to the at least one further predicted incident 114.

The processor 1902 may fetch, decode, and execute the instructions 1920 to prevent (e.g., by the incident preventer 118 that is executed by the at least one hardware processor) occurrence of the at least one further predicted incident 114 by executing the determined resolution 120 to the at least one further predicted incident 114.

Referring to FIGS. 1-18 and 20, and particularly FIG. 20, for the method 2000, at block 2002, the method may include ascertaining, by an incident analyzer that is executed by at least one hardware processor, a plurality of past incidents 104.

At block 2004, the method may include clustering, by the incident analyzer 102 that is executed by at least one hardware processor, the plurality of past incidents 104 to generate a plurality of incidents clusters 106.

At block 2006, the method may include identifying, by the incident analyzer 102 that is executed by at least one hardware processor, for each past incident of the plurality of past incidents 104 that is in a respective incidents cluster 116 of the plurality of incidents clusters 106, a time of occurrence.

At block 2008, the method may include generating, by the incident analyzer 102 that is executed by at least one hardware processor, based on the identification of the time of occurrence of each past incident of the plurality of past incidents 104 that is in the respective incidents cluster 116 of the plurality of incidents clusters 106, a time-based cluster relationship between each incidents cluster 116 of the plurality of incidents clusters 106.

At block 2010, the method may include ascertaining, by an incident predictor 108 that is executed by the at least one hardware processor, a new incident 110.

At block 2012, the method may include assigning, by the incident predictor 108 that is executed by the at least one hardware processor, the new incident 110 to an incidents cluster 116 of the plurality of incidents clusters 106.

At block 2014, the method may include determining, by the incident predictor 108 that is executed by the at least one hardware processor, for the assigned incidents cluster 112, at least one further predicted incident 114 associated with at least one further corresponding incidents cluster.

At block 2016, the method may include determining, by an incident preventer 118 that is executed by the at least one hardware processor, a resolution 120 to the at least one further predicted incident 114.

At block 2018, the method may include preventing, by the incident preventer that is executed by the at least one hardware processor, occurrence of the at least one further predicted incident 114 by executing the determined resolution 120 to the at least one further predicted incident 114.

Referring to FIGS. 1-18 and 21, and particularly FIG. 21, for the block diagram 2100, the non-transitory computer readable medium 2102 may include instructions 2106 to ascertain a plurality of past incidents 104.

The processor 2104 may fetch, decode, and execute the instructions 2108 to cluster the plurality of past incidents 104 to generate a plurality of incidents clusters 106.

The processor 2104 may fetch, decode, and execute the instructions 2110 to identify, for each past incident of the plurality of past incidents 104 that is in a respective incidents cluster 116 of the plurality of incidents clusters 106, a time of occurrence.

The processor 2104 may fetch, decode, and execute the instructions 2112 to ascertain a new incident 110.

The processor 2104 may fetch, decode, and execute the instructions 2114 to determine, with respect to the new incident 110, a score for each incidents cluster 116 of the plurality of incidents clusters 106.

The processor 2104 may fetch, decode, and execute the instructions 2116 to assign the new incident 110 to an incidents cluster 116 of the plurality of incidents clusters 106 that includes a highest determined score.

The processor 2104 may fetch, decode, and execute the instructions 2118 to determine, for the assigned incidents cluster 112, at least one further predicted incident 114 associated with at least one further corresponding incidents cluster.

The processor 2104 may fetch, decode, and execute the instructions 2120 to determine a resolution 120 to the at least one further predicted incident 114.

The processor 2104 may fetch, decode, and execute the instructions 2122 to prevent occurrence of the at least one further predicted incident 114 by executing the determined resolution 120 to the at least one further predicted incident 114.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An incident prediction and prevention apparatus comprising:
   an incident analyzer, executed by at least one hardware processor, to
      ascertain a plurality of past incidents related to operation of a system,
      cluster the plurality of past incidents to generate a plurality of incidents clusters,
      identify, for each past incident of the plurality of past incidents that is in a respective incidents cluster of the plurality of incidents clusters, a time of occurrence, and
      generate, based on the identification of the time of occurrence of each past incident of the plurality of past incidents that is in the respective incidents cluster of the plurality of incidents clusters, a time-based cluster relationship between each incidents cluster of the plurality of incidents clusters;
   an incident predictor, executed by the at least one hardware processor, to
      ascertain a new incident associated with another system,
      assign the new incident to an incidents cluster of the plurality of incidents clusters, and
      determine, for the assigned incidents cluster, at least one further predicted incident associated with at least one further corresponding incidents cluster, wherein the at least one further predicted incident includes an error associated with operation of a server associated with the another system; and
   an incident preventer, executed by the at least one hardware processor, to
      determine a resolution to the at least one further predicted incident, wherein the resolution includes modifying the operation of the server associated with the another system, and
      prevent occurrence of the at least one further predicted incident by executing the determined resolution to the at least one further predicted incident.

2. The incident prediction and prevention apparatus according to claim 1, wherein the incident analyzer is executed by the at least one hardware processor to cluster the plurality of past incidents to generate the plurality of incidents clusters by
   performing unsupervised clustering of the past incidents to generate the plurality of incidents clusters.

3. The incident prediction and prevention apparatus according to claim 1, wherein the incident analyzer is executed by the at least one hardware processor to
   determine, based on a number of time-based connections between each incidents cluster of the plurality of incidents clusters, a strength of the time-based cluster relationship between each incidents cluster of the plurality of incidents clusters.

4. The incident prediction and prevention apparatus according to claim 3, wherein the incident predictor is executed by the at least one hardware processor to determine, for the assigned incidents cluster, at least one further predicted incident associated with at least one further corresponding incidents cluster by analyzing the strength of the time-based cluster relationship between the assigned incidents cluster and each downstream incidents cluster relative to the assigned incidents cluster, and identifying, based on the analysis of the strength of the time-based cluster relationship between the assigned incidents cluster and each downstream incidents cluster relative to the assigned incidents cluster, a strongest time-based cluster relationship between the assigned incidents cluster and a downstream incidents cluster.

5. The incident prediction and prevention apparatus according to claim 1, wherein the incident predictor is executed by the at least one hardware processor to assign the new incident to the incidents cluster of the plurality of incidents clusters by determining, with respect to the new incident, a score for each incidents cluster of the plurality of incidents clusters, and assigning the new incident to the incidents cluster of the plurality of incidents clusters that includes a highest determined score.

6. The incident prediction and prevention apparatus according to claim 1, wherein the incident predictor is executed by the at least one hardware processor to determine, based on analysis of the time of occurrence of selected past incidents from the assigned incidents cluster and the at least one further corresponding incidents cluster, an estimated time of occurrence of the at least one further predicted incident.

7. The incident prediction and prevention apparatus according to claim 6, wherein the incident preventer is executed by the at least one hardware processor to execute the determined resolution to the at least one further predicted incident prior to expiration of the estimated time of occurrence of the at least one further predicted incident.

8. The incident prediction and prevention apparatus according to claim 1, wherein the incident predictor is executed by the at least one hardware processor to determine an estimated time of occurrence of the at least one further predicted incident by:

determining a difference between an earliest time of occurrence of selected past incidents from the assigned incidents cluster and a latest time of occurrence of selected past incidents from the at least one further corresponding incidents cluster; and averaging the determined differences.

9. The incident prediction and prevention apparatus according to claim 1, wherein the incident predictor is executed by the at least one hardware processor to determine an estimated time of occurrence of the at least one further predicted incident by:

determining a difference between an earliest time of occurrence of selected past incidents from the assigned incidents cluster and a latest time of occurrence of selected past incidents from the at least one further corresponding incidents cluster; and dividing the determined differences by a size of a strongest outgoing edge between the assigned incidents cluster and the at least one further corresponding incidents cluster.

10. A method for incident prediction and prevention comprising:

ascertaining, by an incident analyzer that is executed by at least one hardware processor, a plurality of past incidents related to operation of a system;

clustering, by the incident analyzer that is executed by at least one hardware processor, the plurality of past incidents to generate a plurality of incidents clusters;

identifying, by the incident analyzer that is executed by at least one hardware processor, for each past incident of the plurality of past incidents that is in a respective incidents cluster of the plurality of incidents clusters, a time of occurrence;

generating, by the incident analyzer that is executed by at least one hardware processor, based on the identification of the time of occurrence of each past incident of the plurality of past incidents that is in the respective incidents cluster of the plurality of incidents clusters, a time-based cluster relationship between each incidents cluster of the plurality of incidents clusters;

determining, by the incident analyzer that is executed by the at least one hardware processor, based on a number of time-based connections between each incidents cluster of the plurality of incidents clusters, a strength of the time-based cluster relationship between each incidents cluster of the plurality of incidents clusters;

ascertaining, by an incident predictor that is executed by the at least one hardware processor, a new incident associated with another system;

assigning, by the incident predictor that is executed by the at least one hardware processor, the new incident to an incidents cluster of the plurality of incidents clusters;

determining, by the incident predictor that is executed by the at least one hardware processor, for the assigned incidents cluster, at least one further predicted incident associated with at least one further corresponding incidents cluster, wherein the at least one further predicted incident includes an error associated with operation of a server associated with the another system;

determining, by an incident preventer that is executed by the at least one hardware processor, a resolution to the at least one further predicted incident, wherein the resolution includes modifying the operation of the server associated with the another system; and preventing, by the incident preventer that is executed by the at least one hardware processor, occurrence of the at least one further predicted incident by executing the determined resolution to the at least one further predicted incident.

11. The method according to claim 10, further comprising:

analyzing, by the incident predictor that is executed by the at least one hardware processor, the strength of the time-based cluster relationship between the assigned incidents cluster and each downstream incidents cluster relative to the assigned incidents cluster; and identifying, by the incident predictor that is executed by the at least one hardware processor, based on the analysis of the strength of the time-based cluster relationship between the assigned incidents cluster and each downstream incidents cluster relative to the assigned incidents cluster, a strongest time-based cluster relationship between the assigned incidents cluster and a downstream incidents cluster.

12. The method according to claim 10, further comprising:

determining, by the incident predictor that is executed by the at least one hardware processor, with respect to the new incident, a score for each incidents cluster of the plurality of incidents clusters; and assigning, by the incident predictor that is executed by the at least one hardware processor, the new incident to the incidents cluster of the plurality of incidents clusters that includes a highest determined score.

13. The method according to claim 10, further comprising:
   determining, by the incident predictor that is executed by the at least one hardware processor, based on analysis of the time of occurrence of selected past incidents from the assigned incidents cluster and the at least one further corresponding incidents cluster, an estimated time of occurrence of the at least one further predicted incident.

14. The method according to claim 13, further comprising:
   executing, by the incident preventer that is executed by the at least one hardware processor, the determined resolution to the at least one further predicted incident prior to expiration of the estimated time of occurrence of the at least one further predicted incident.

15. The method according to claim 10, wherein clustering, by the incident analyzer that is executed by the at least one hardware processor, the plurality of past incidents to generate the plurality of incidents clusters further comprises:
   performing unsupervised clustering of the past incidents to generate the plurality of incidents clusters.

16. A non-transitory computer readable medium having stored thereon machine readable instructions, the machine readable instructions, when executed by at least one hardware processor, cause the at least one hardware processor to:
   ascertain a plurality of past incidents related to operation of a system;
   cluster the plurality of past incidents to generate a plurality of incidents clusters;
   identify, for each past incident of the plurality of past incidents that is in a respective incidents cluster of the plurality of incidents clusters, a time of occurrence;
   ascertain a new incident associated with another system;
   determine, with respect to the new incident, a score for each incidents cluster of the plurality of incidents clusters;
   assign the new incident to an incidents cluster of the plurality of incidents clusters that includes a highest determined score;
   determine, for the assigned incidents cluster, at least one further predicted incident associated with at least one further corresponding incidents cluster, wherein the at least one further predicted incident includes an error associated with operation of a server associated with the another system;
   determine an estimated time of occurrence of the at least one further predicted incident by:
      determining a difference between an earliest time of occurrence of selected past incidents from the assigned incidents cluster and a latest time of occurrence of selected past incidents from the at least one further corresponding incidents cluster; and
      averaging the determined differences or dividing the determined differences by a size of a strongest outgoing edge between the assigned incidents cluster and the at least one further corresponding incidents cluster;
   determine a resolution to the at least one further predicted incident, wherein the resolution includes modifying the operation of the server associated with the another system; and
   prevent occurrence of the at least one further predicted incident by executing the determined resolution to the at least one further predicted incident.

17. The non-transitory computer readable medium according to claim 16, wherein the instructions are further to cause the at least one hardware processor to:
   determine, based on analysis of the time of occurrence of selected past incidents from the assigned incidents cluster and the at least one further corresponding incidents cluster, an estimated time of occurrence of the at least one further predicted incident.

18. The non-transitory computer readable medium according to claim 17, wherein the instructions are further to cause the at least one hardware processor to:
   execute the determined resolution to the at least one further predicted incident prior to expiration of the estimated time of occurrence of the at least one further predicted incident.

19. The non-transitory computer readable medium according to claim 16, wherein the instructions to cluster the plurality of past incidents to generate the plurality of incidents clusters are further to cause the at least one hardware processor to:
   perform unsupervised clustering of the past incidents to generate the plurality of incidents clusters.

20. The non-transitory computer readable medium according to claim 16, wherein the instructions are further to cause the at least one hardware processor to:
   determine, based on a number of time-based connections between each incidents cluster of the plurality of incidents clusters, a strength of a time-based cluster relationship between each incidents cluster of the plurality of incidents clusters.

* * * * *